Figure 16:
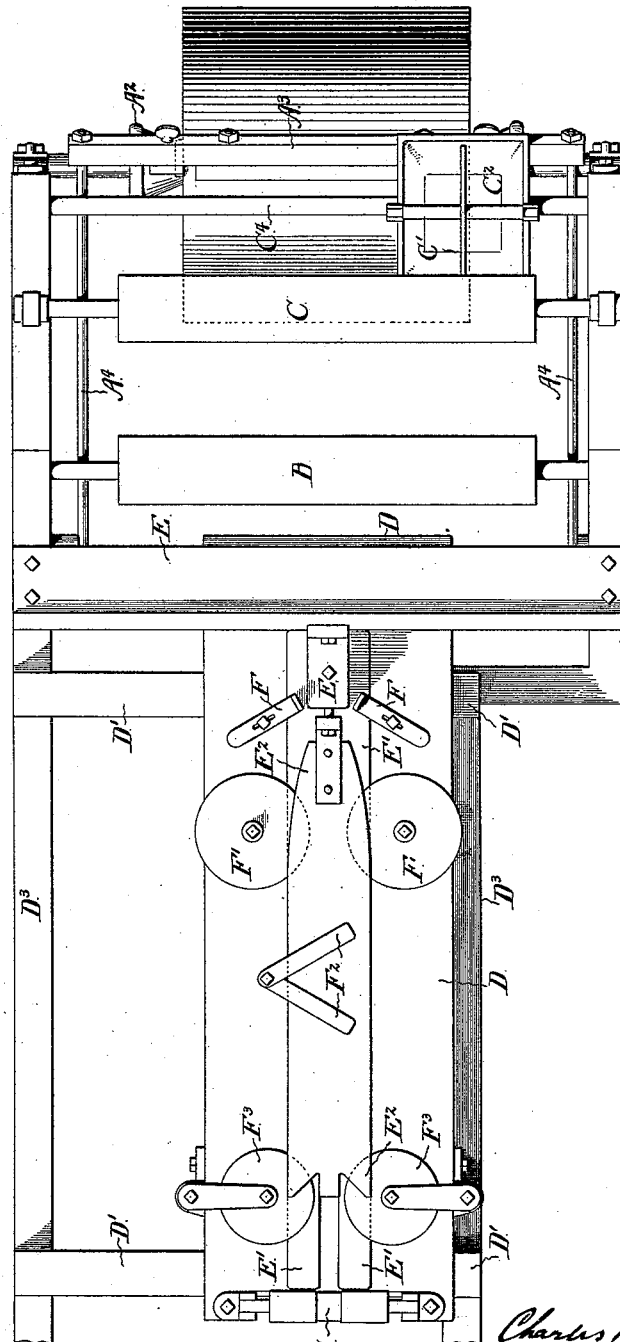

(No Model.) 21 Sheets—Sheet 1.
C. B. STILWELL.
PAPER BAG MACHINERY.
No. 407,794. Patented July 30, 1889.
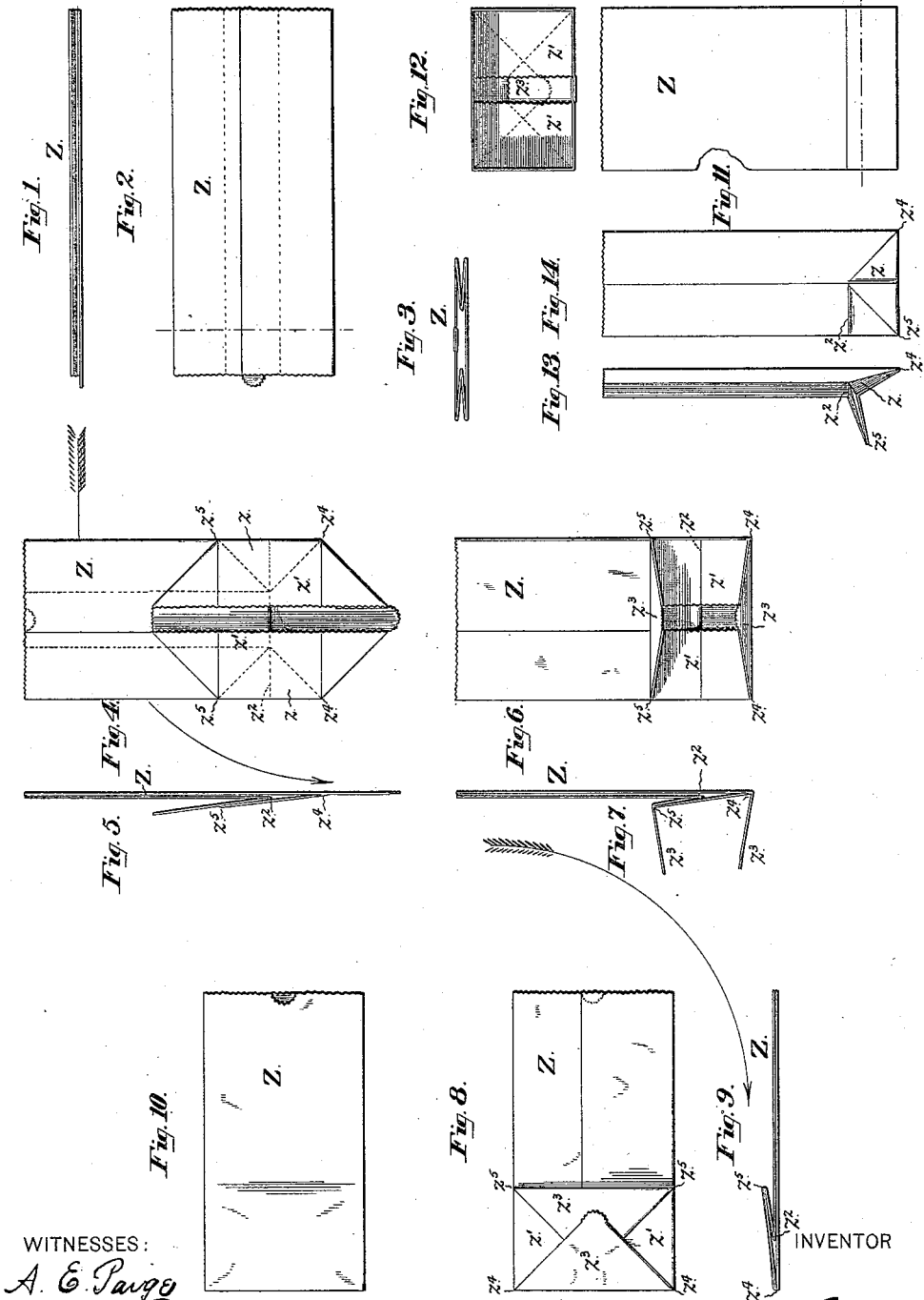
WITNESSES:
A. E. Paige
J. W. Van Pearl
INVENTOR
Charles B. Stilwell
by his attorney
Francis T. Chambers

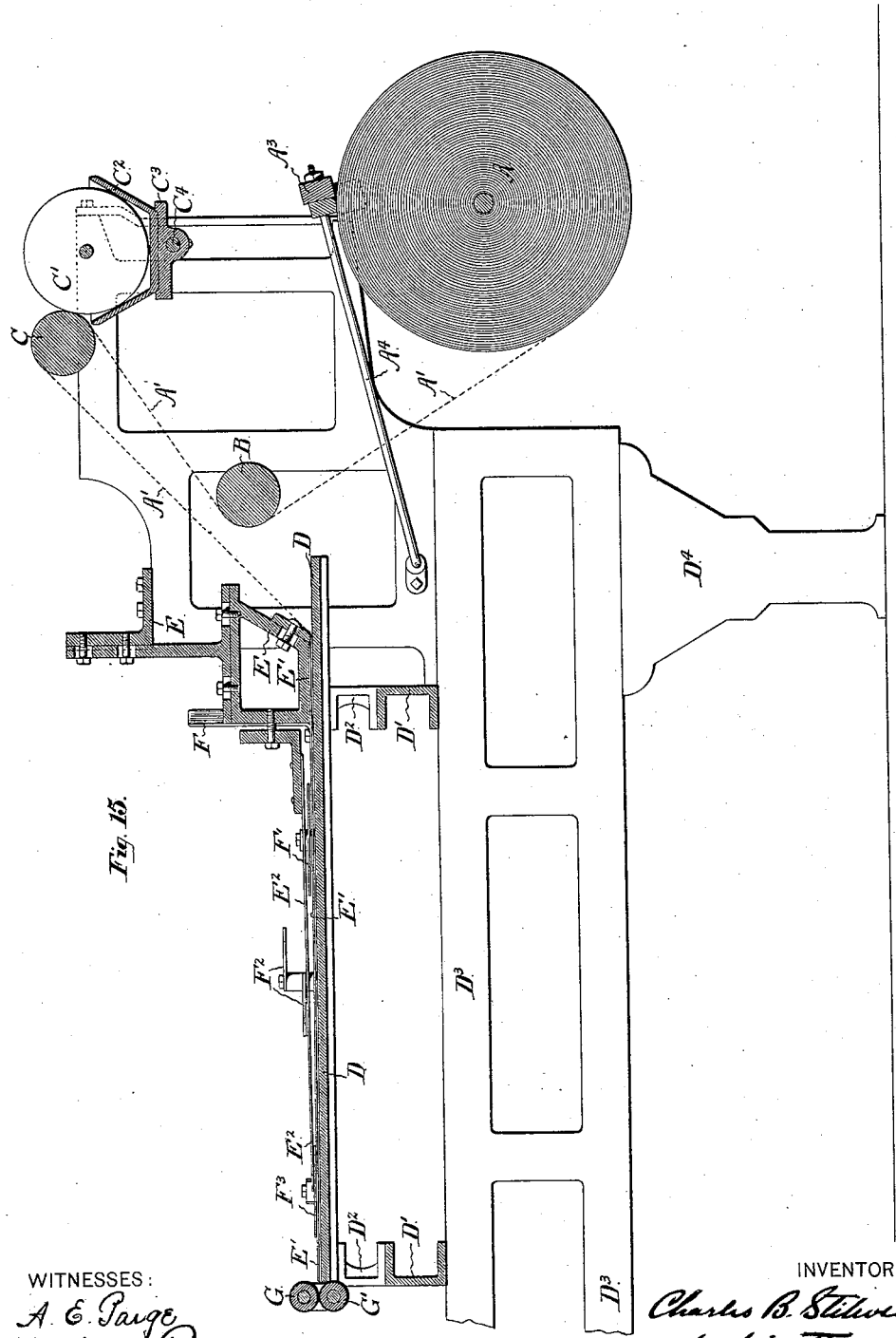

(No Model.) 21 Sheets—Sheet 3.

C. B. STILWELL.
PAPER BAG MACHINERY.

No. 407,794. Patented July 30, 1889.

WITNESSES: INVENTOR (No Model.)  21 Sheets—Sheet 6.

C. B. STILWELL.
PAPER BAG MACHINERY.

No. 407,794.  Patented July 30, 1889.

WITNESSES:
A. E. Paige
H. W. Van Paul

INVENTOR
Charles B. Stilwell
by his attorney
Francis T. Chambers (No Model.) 21 Sheets—Sheet 7.
C. B. STILWELL.
PAPER BAG MACHINERY.
No. 407,794. Patented July 30, 1889.
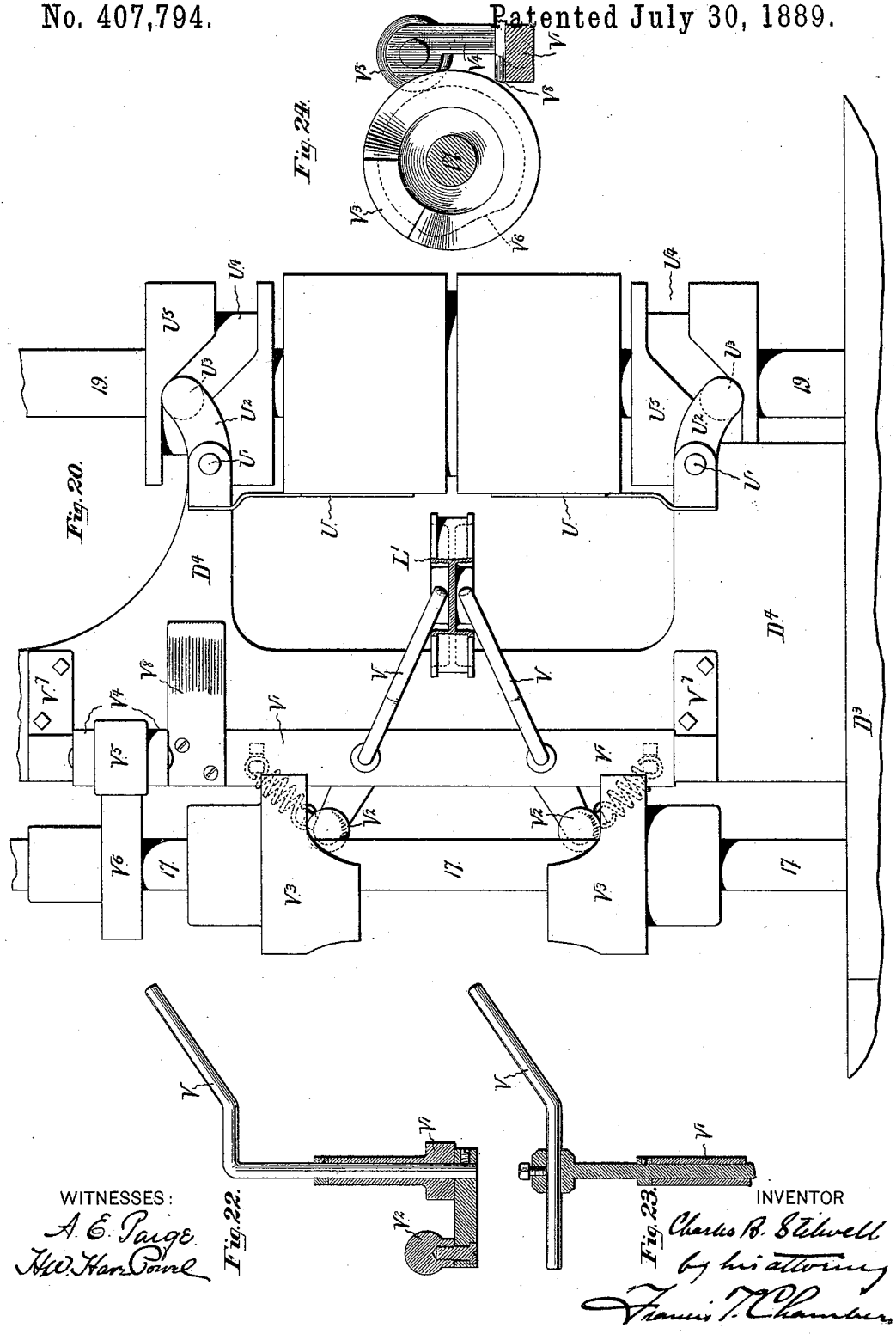

(No Model.) 21 Sheets—Sheet 8.
C. B. STILWELL.
PAPER BAG MACHINERY.
No. 407,794. Patented July 30, 1889.
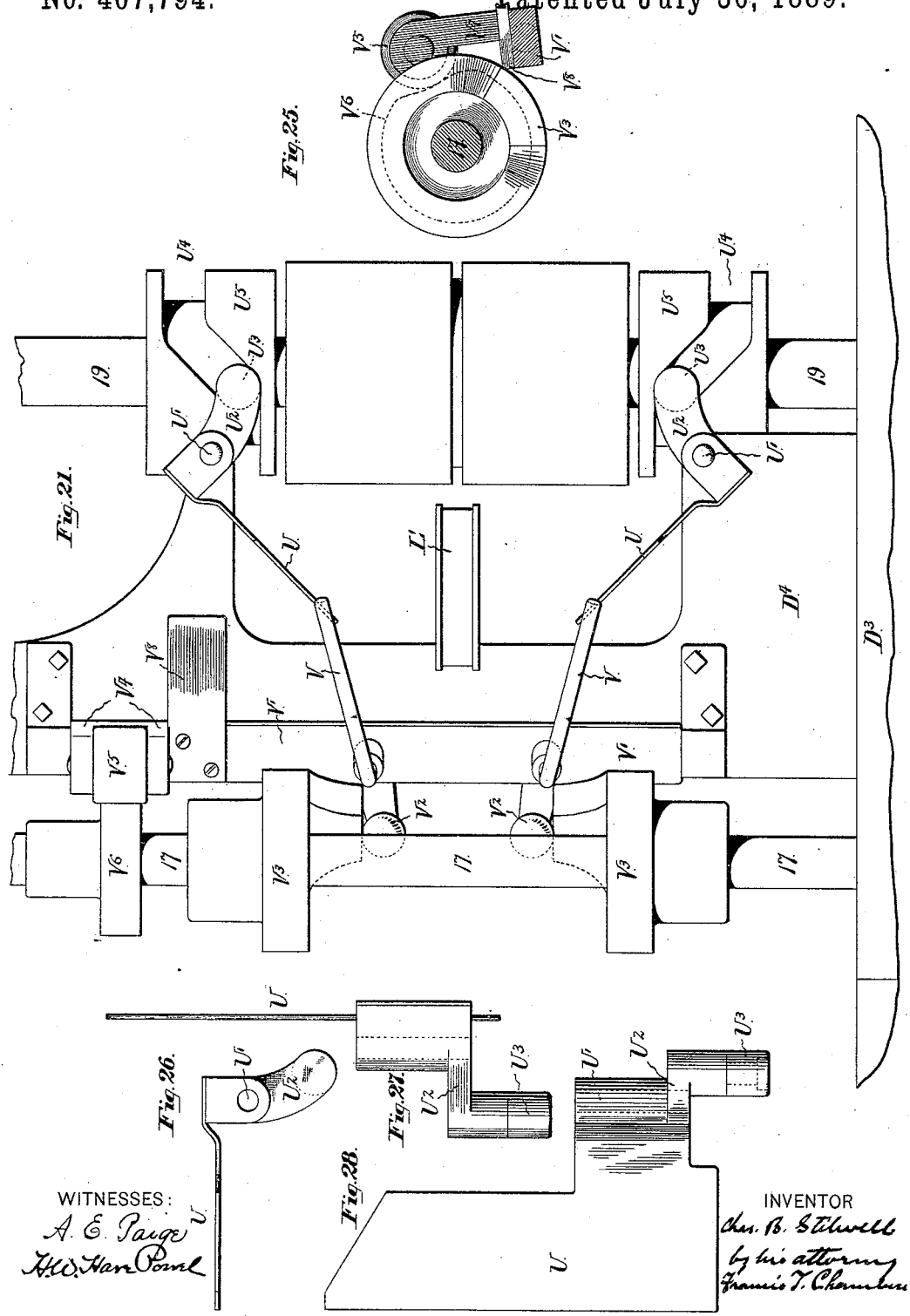
WITNESSES:
INVENTOR

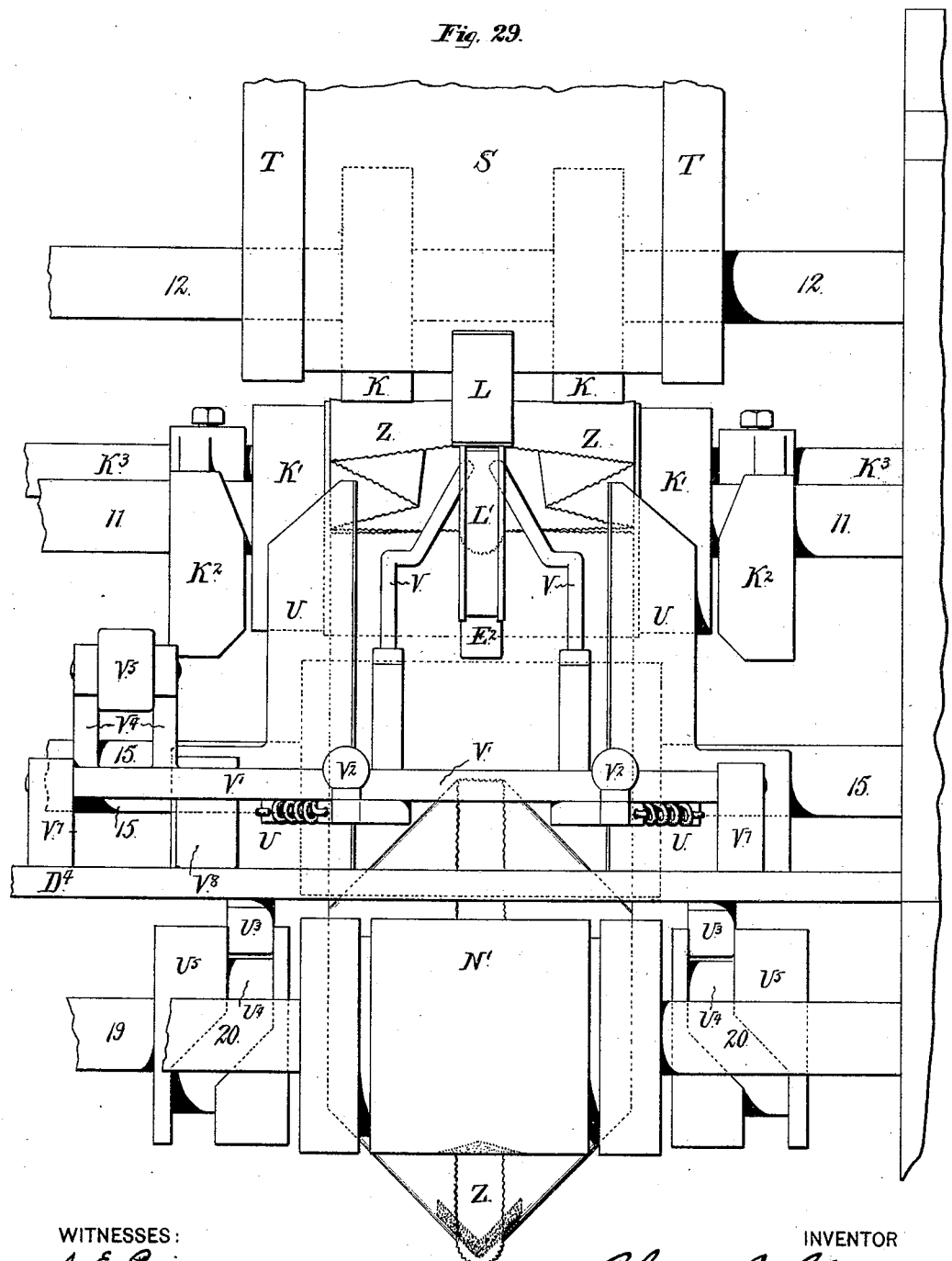

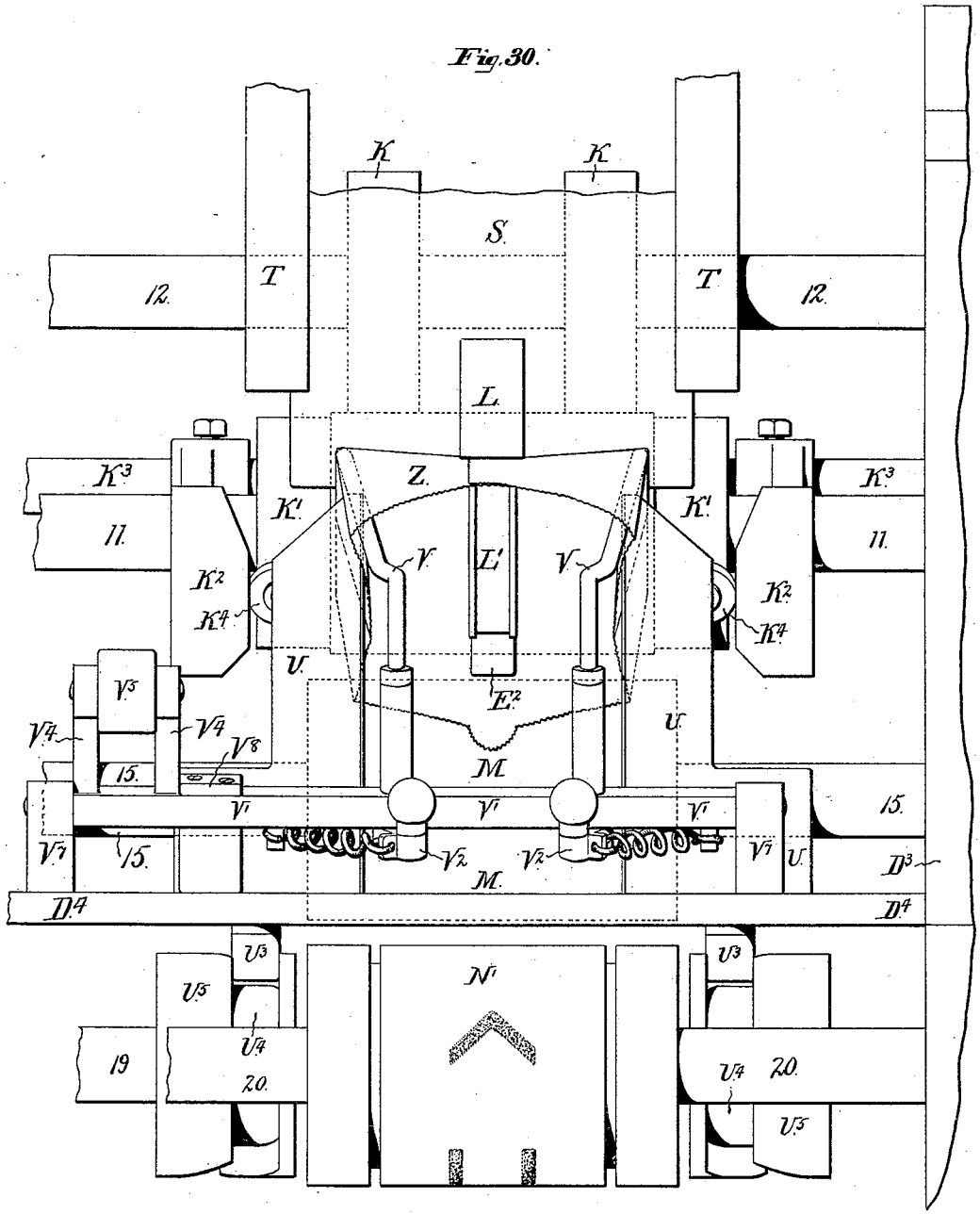

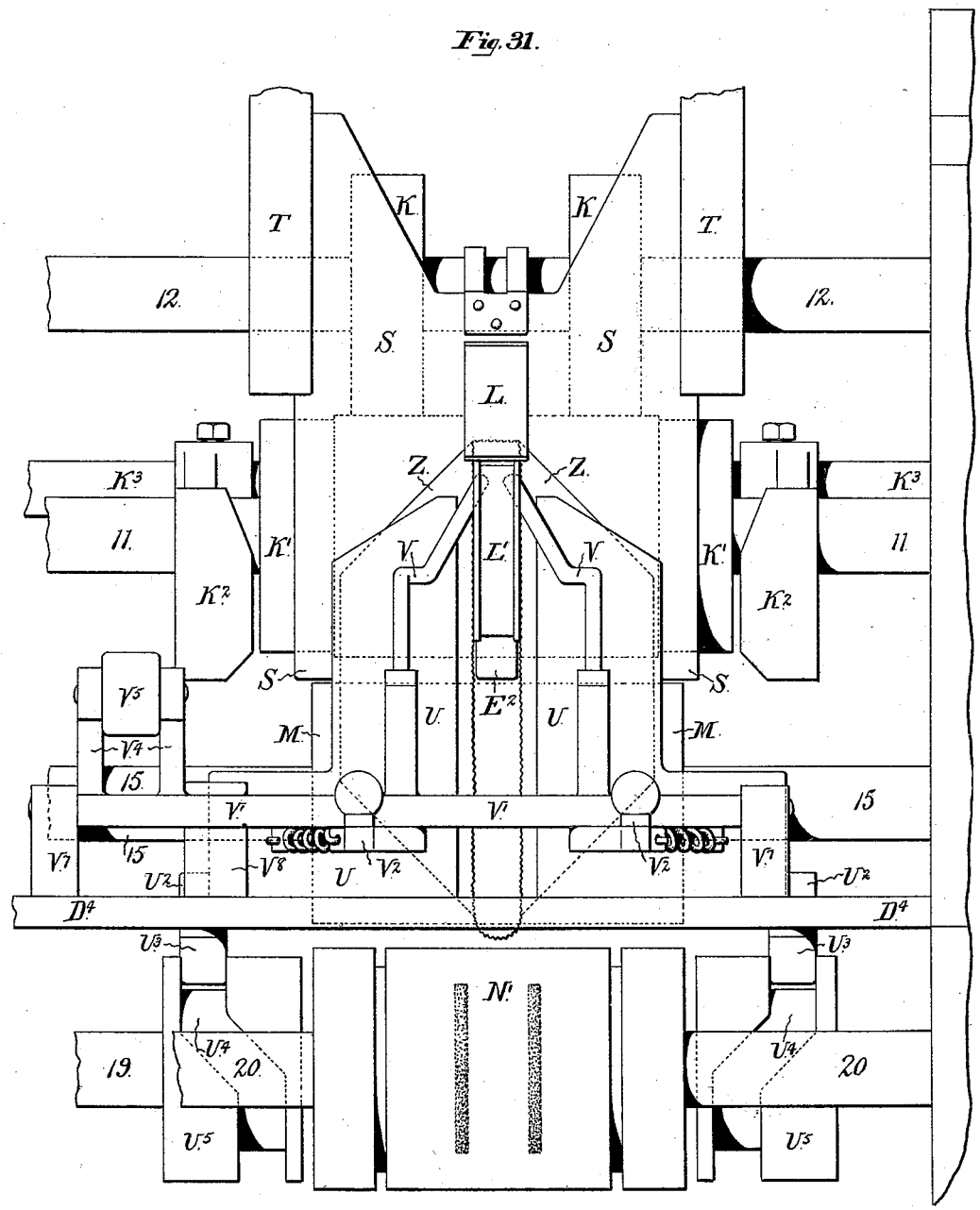

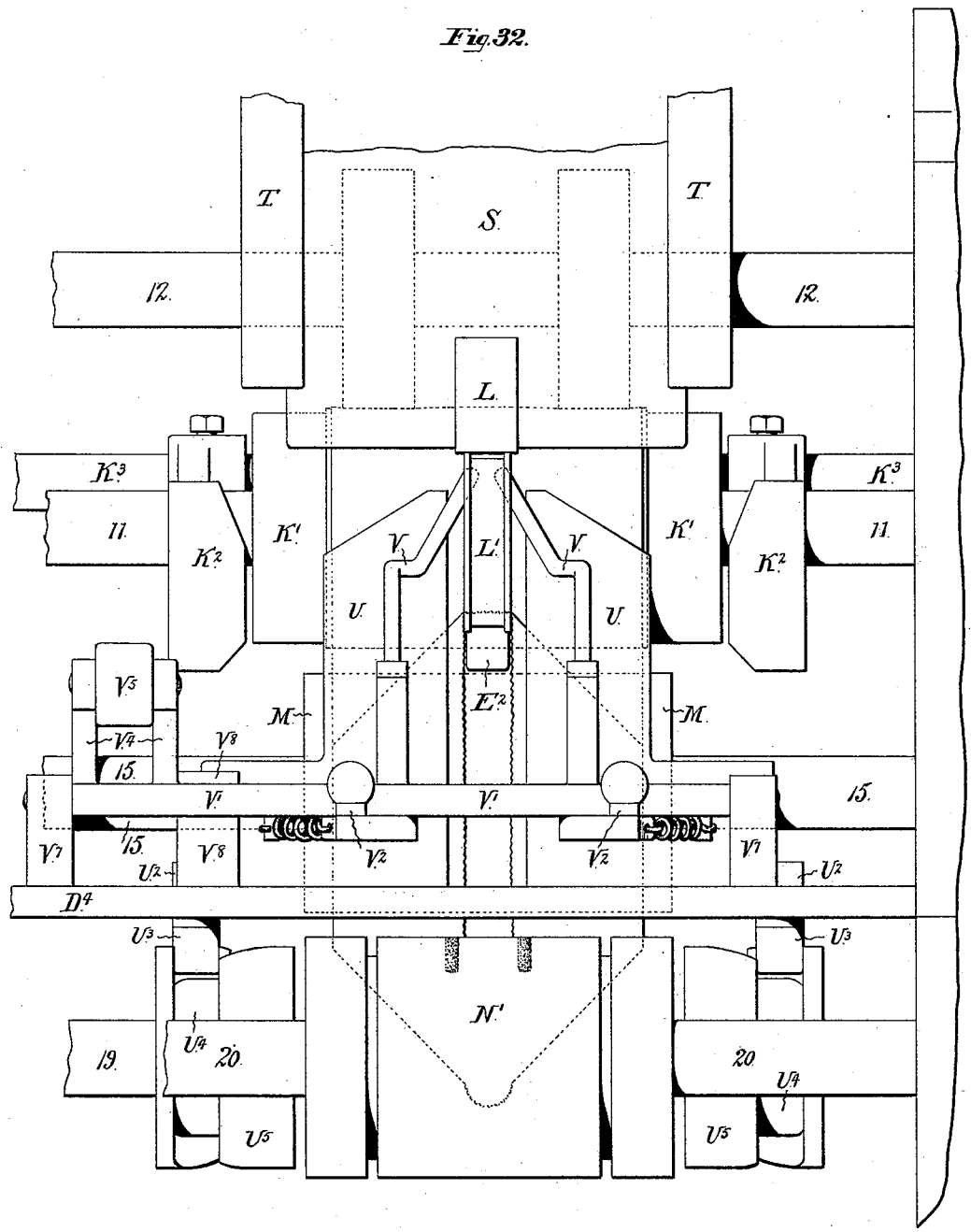

(No Model.) 21 Sheets—Sheet 13.

C. B. STILWELL.
PAPER BAG MACHINERY.

No. 407,794. Patented July 30, 1889.

WITNESSES:
A. E. Paige.
J. W. Van Orme

INVENTOR
Charles B. Stilwell
by his attorney
Francis T. Chambers (No Model.) 21 Sheets—Sheet 14.

C. B. STILWELL.
PAPER BAG MACHINERY.

No. 407,794. Patented July 30, 1889.

WITNESSES:
A. E. Paige
H. W. Han Powel

INVENTOR
Charles B. Stilwell
by his attorney
Francis T. Chambers (No Model.) 21 Sheets—Sheet 15.

C. B. STILWELL.
PAPER BAG MACHINERY.

No. 407,794. Patented July 30, 1889.

WITNESSES:
A. E. Paige
H. W. Van Paul

INVENTOR
Charles B. Stilwell
by his attorneys
Francis T. Chambers

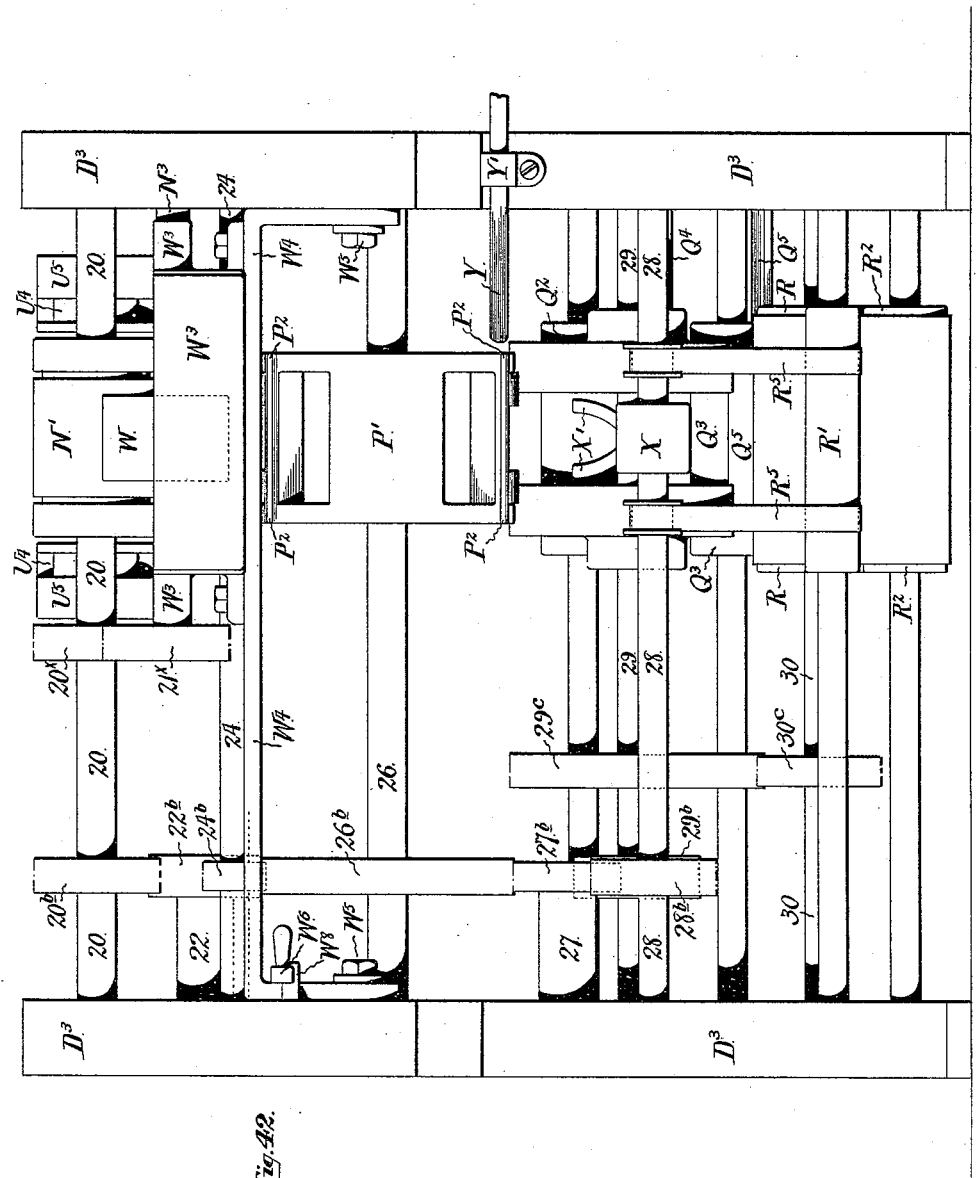

(No Model.) 21 Sheets—Sheet 17.
C. B. STILWELL.
PAPER BAG MACHINERY.
No. 407,794. Patented July 30, 1889.
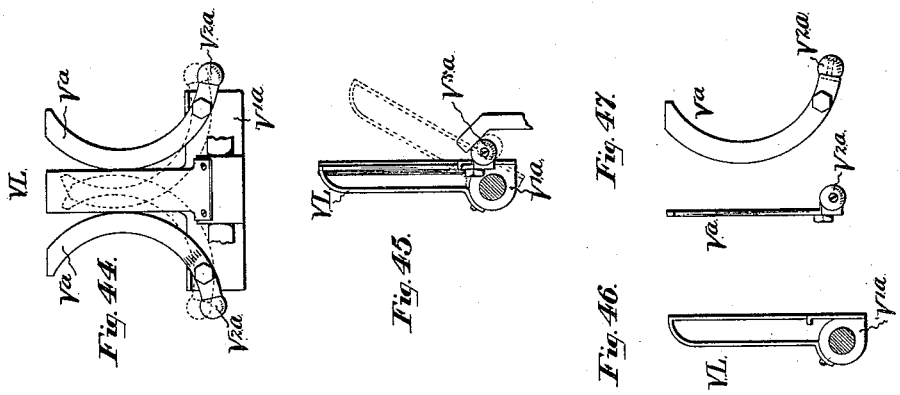
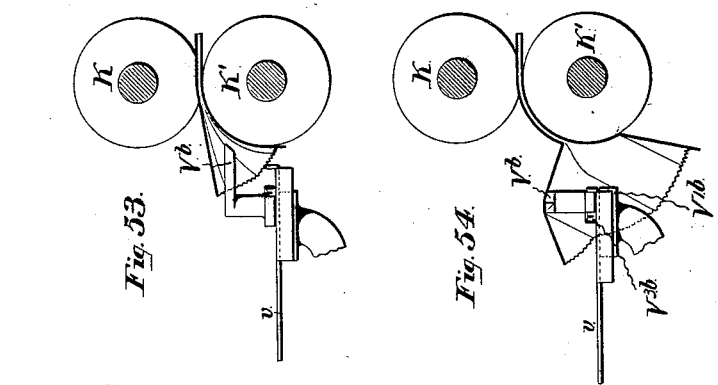
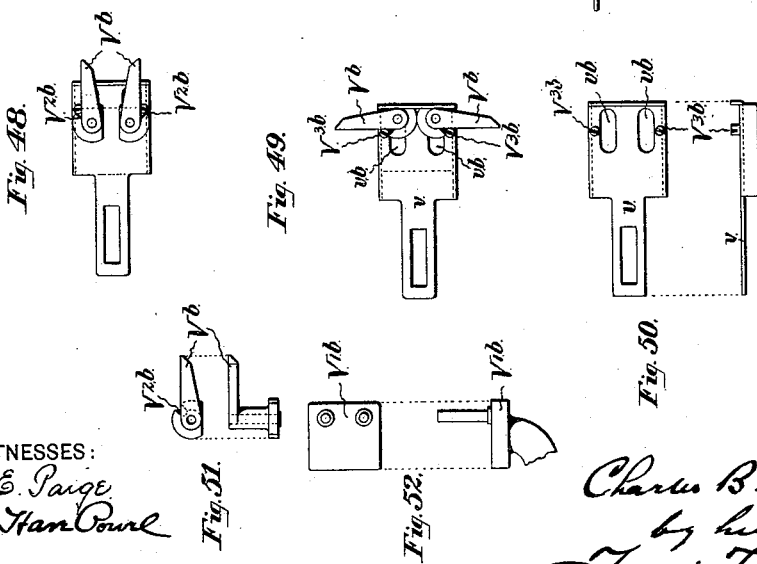
WITNESSES:
A. E. Paige
H. W. Hancourt
INVENTOR
Charles B. Stilwell
by his attorney
Francis T. Chambers (No Model.) 21 Sheets—Sheet 18.
C. B. STILWELL.
PAPER BAG MACHINERY.
No. 407,794. Patented July 30, 1889.
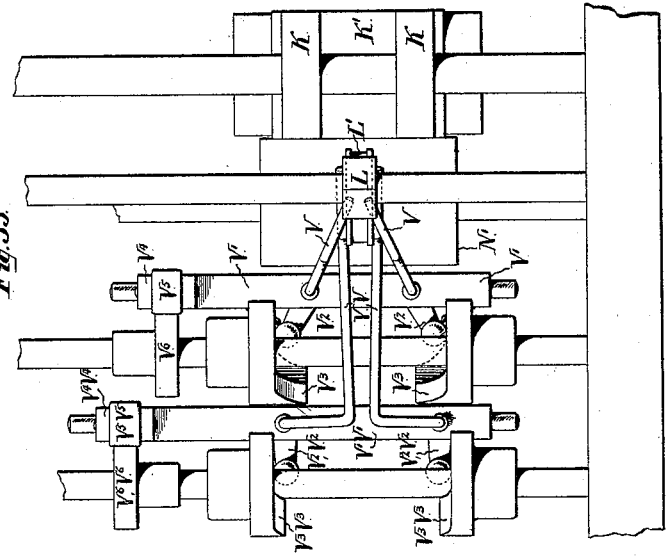
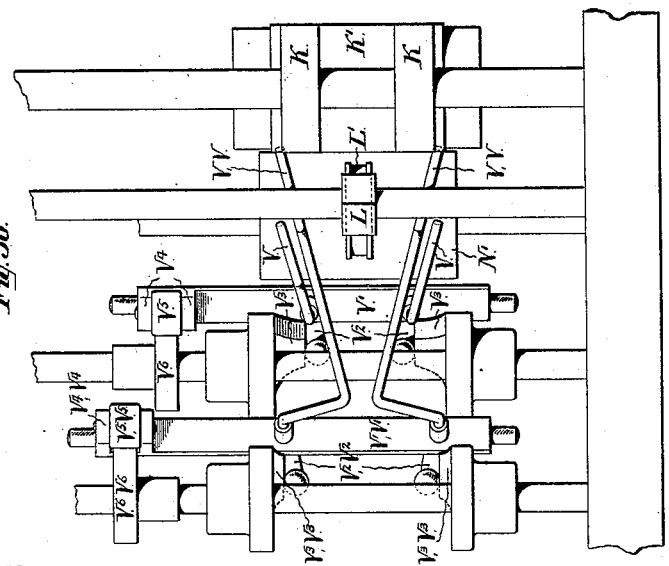
WITNESSES:
INVENTOR
Charles B. Stilwell
by his attorney
Francis T. Chambers (No Model.) 21 Sheets—Sheet 19.

C. B. STILWELL.
PAPER BAG MACHINERY.

No. 407,794. Patented July 30, 1889.

WITNESSES:
A. E. Paige
H. W. Van Voorl

INVENTOR
Charles B. Stilwell
by his attorney
Francis T. Chambers

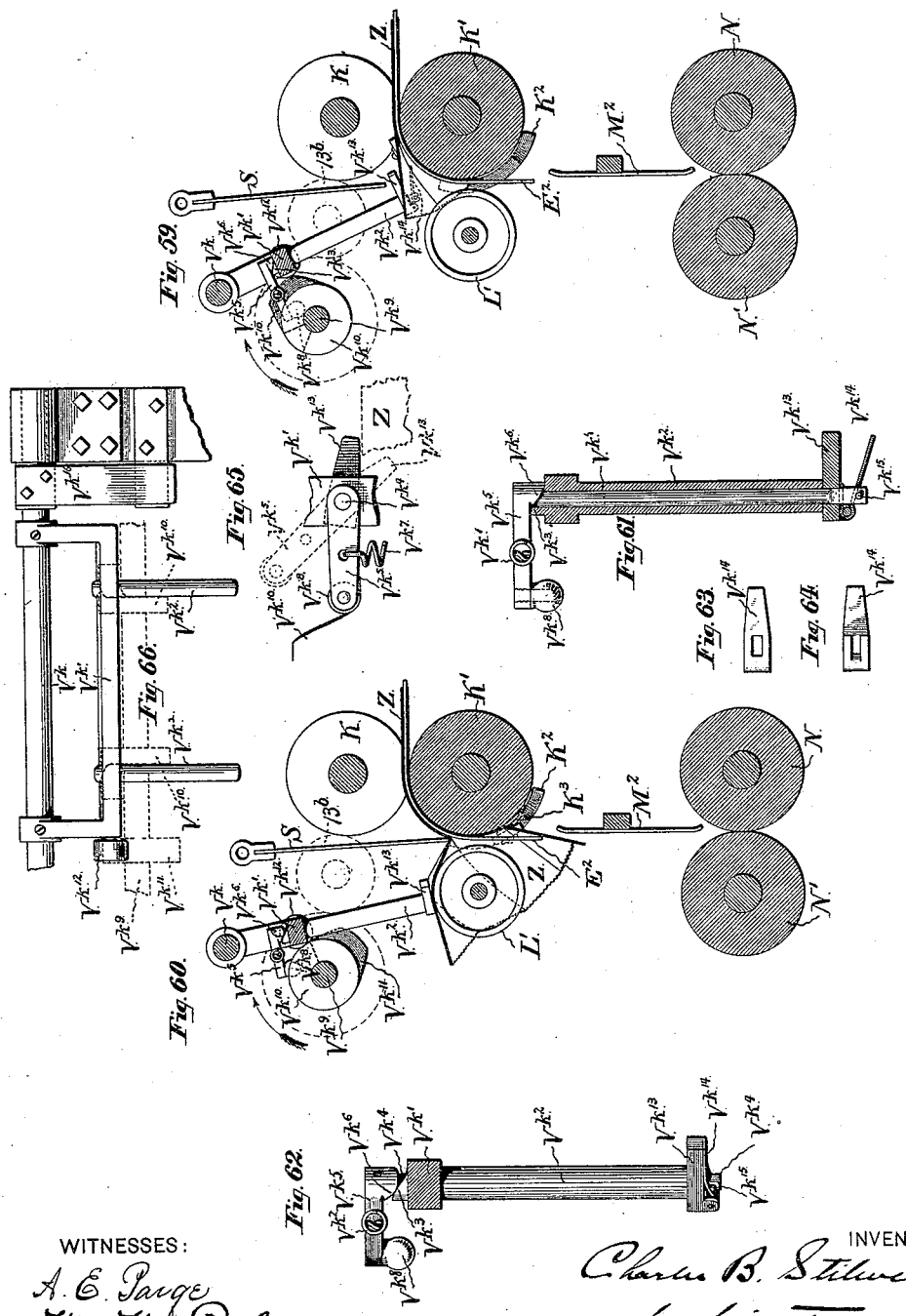

(No Model.) 21 Sheets—Sheet 21.

C. B. STILWELL.
PAPER BAG MACHINERY.

No. 407,794. Patented July 30, 1889.

WITNESSES:
A. E. Paige
Geo. J. Van Pool

INVENTOR
Charles B. Stilwell
by his attorney
Francis T. Chambers

UNITED STATES PATENT OFFICE.

CHARLES B. STILWELL, OF PHILADELPHIA, PENNSYLVANIA, ASSIGNOR TO THE UNION PAPER BAG MACHINE COMPANY, OF SAME PLACE.

PAPER-BAG MACHINERY.

SPECIFICATION forming part of Letters Patent No. 407,794, dated July 30, 1889.

Application filed March 21, 1888. Serial No. 267,965. (No model.)

*To all whom it may concern:*

Be it known that I, CHARLES B. STILWELL, a resident of the city and county of Philadelphia, State of Pennsylvania, have invented a new and useful Improvement in Paper-Bag Machinery, of which the following is a true and exact description, reference being had to the accompanying drawings, which form a part of this specification.

My invention relates to the construction of machinery adapted to make paper bags of the peculiar formation shown in the reissued Letters Patent No. 10,083, granted the Union Paper Bag Machine Company, April 11, 1882, as the assignee of Mark L. Deering; and the object of my invention is to provide means and appliances whereby such bags can be rapidly and economically manufactured.

Bags of the above kind when opened for use do not differ from the well-known satchel-bottom bag made from a plain tube of paper, and, as in the old satchel-bottom bags, the first step in the formation of their bottoms is to open and spread out one end of the tube, thus forming what in the manufacture of the old satchel-bottom bags is called the "diamond," which term is also applicable to the opened and flattened end of the tube as formed in the process of making the new bag, although in the latter case the two lateral corners of the diamond figure which forms part of the sides of the bag when distended are folded inward, so that they lie upon the true bottom of the bag instead of extending out from said bottom, as in the old bag, and the figure of the opened end of the blank is therefore not a true diamond, but a diamond with its lateral edges truncated. In both the old and new bags the final folds which complete the bag ready for market are made by folding the front and back corners of the diamond down upon each other and upon the inwardly-folded flaps of the diamond.

My present invention relates, principally, to the means whereby the end of a bellows-folded tube is opened and spread out into the truncated diamond form to which I have referred. Its features and details will be better understood after an examination of the drawings, which represent a paper-bag machine embodying my invention.

Figure 17:
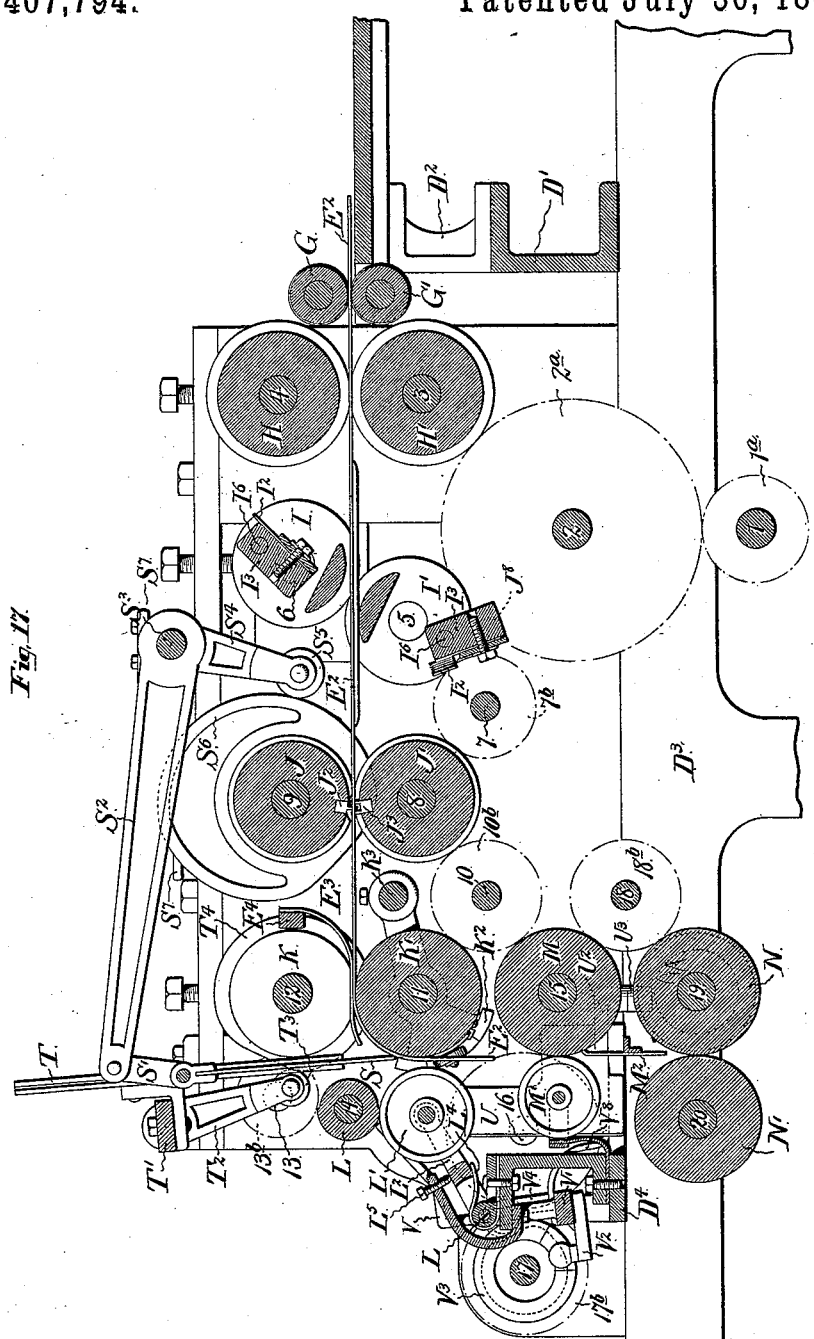
Figure 18:
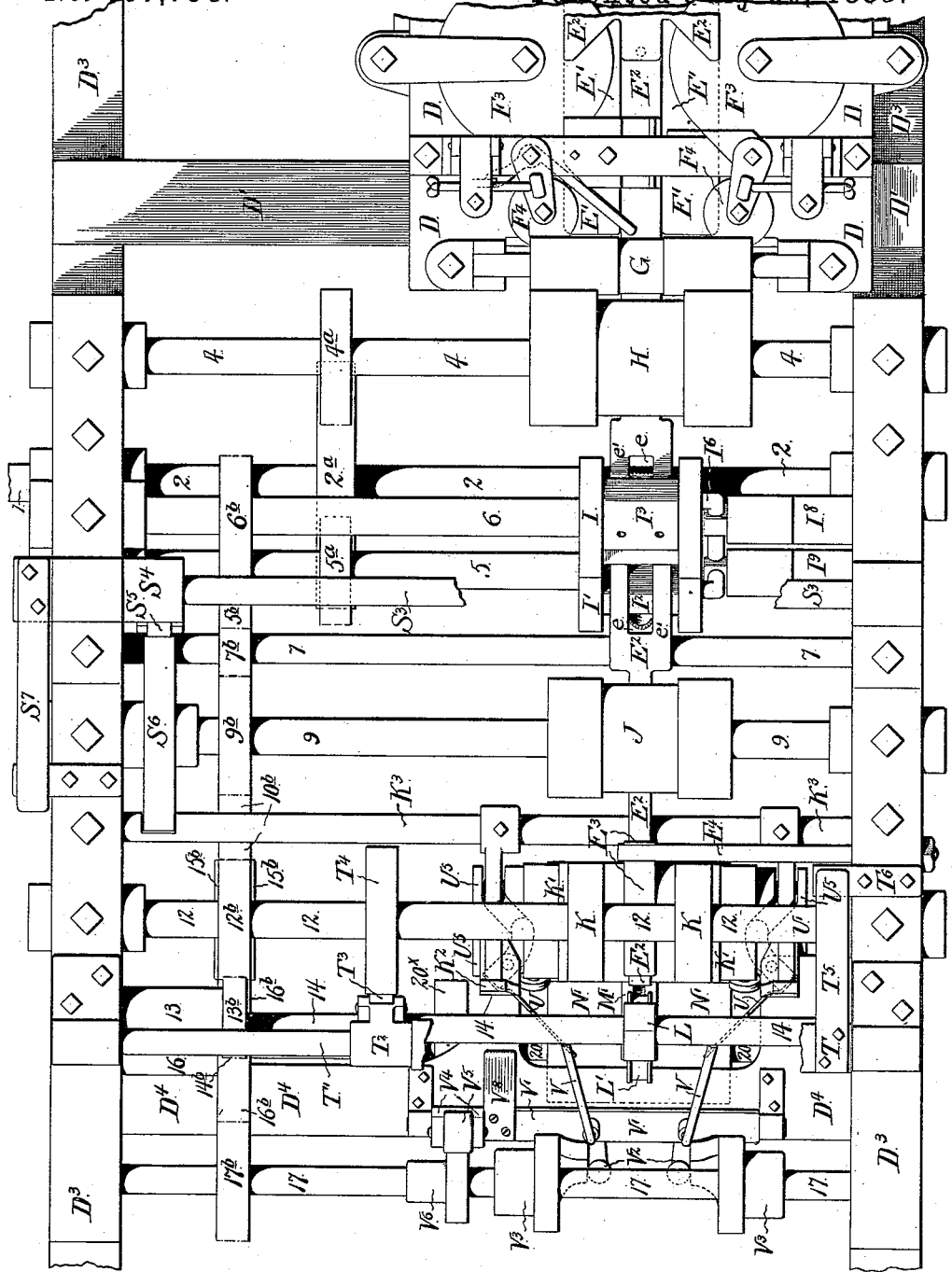
Figure 19:
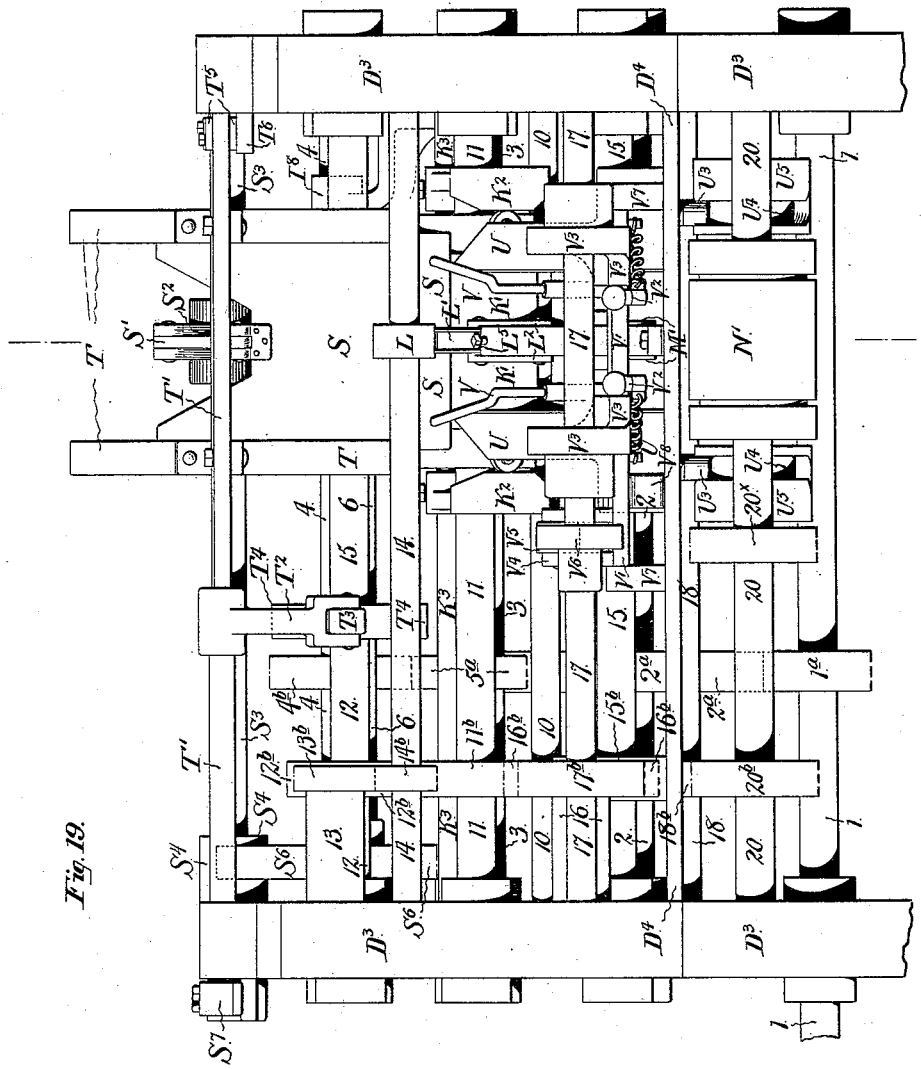
Figure 33:
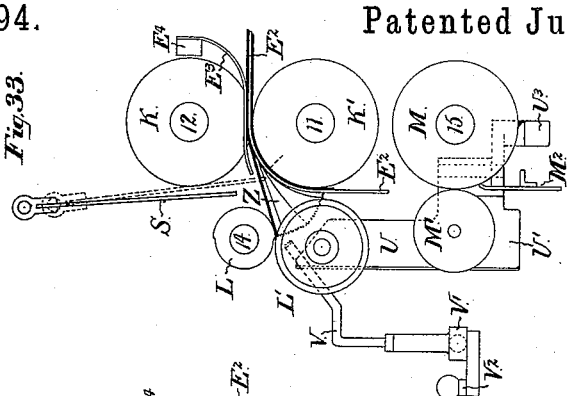
Figure 34:
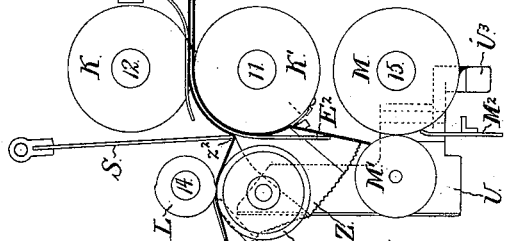
Figure 35:
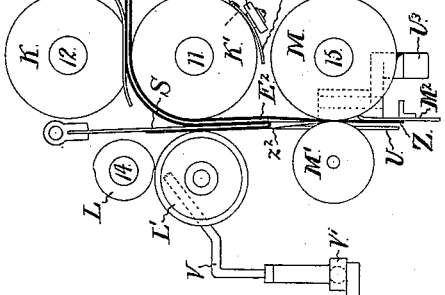
Figure 36:
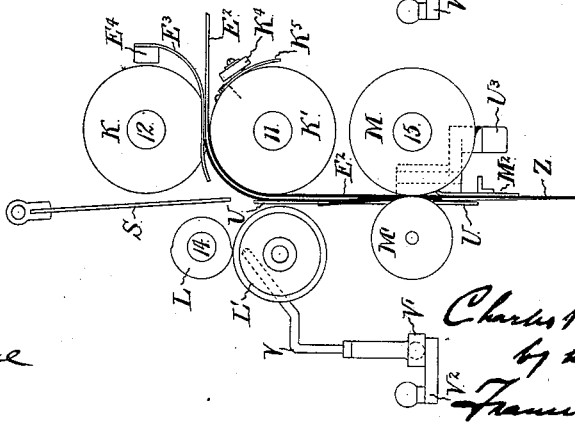
Figure 37:
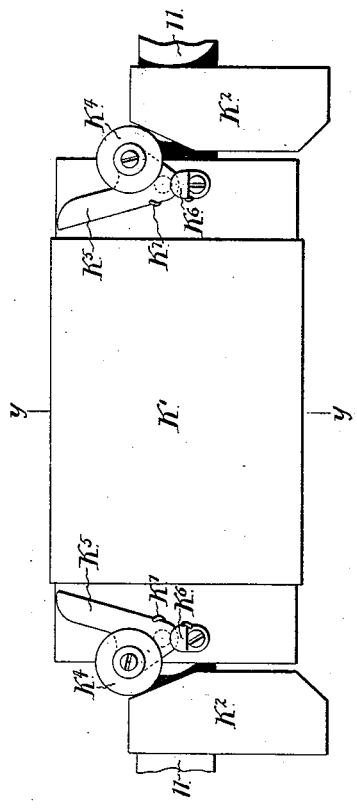
Figure 39:
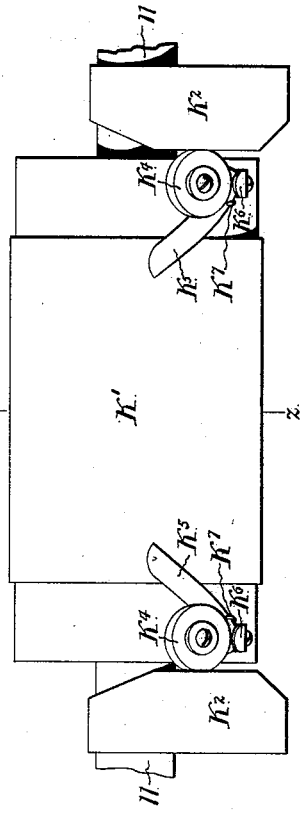
Figure 38:
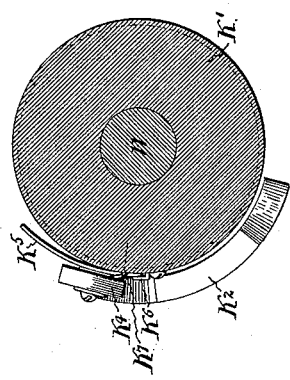
Figure 40:
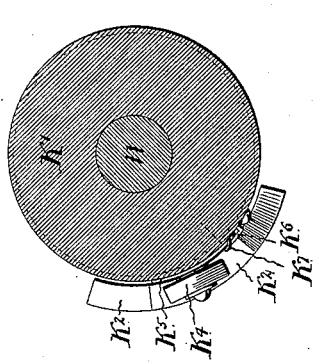
Figures 41, 43:
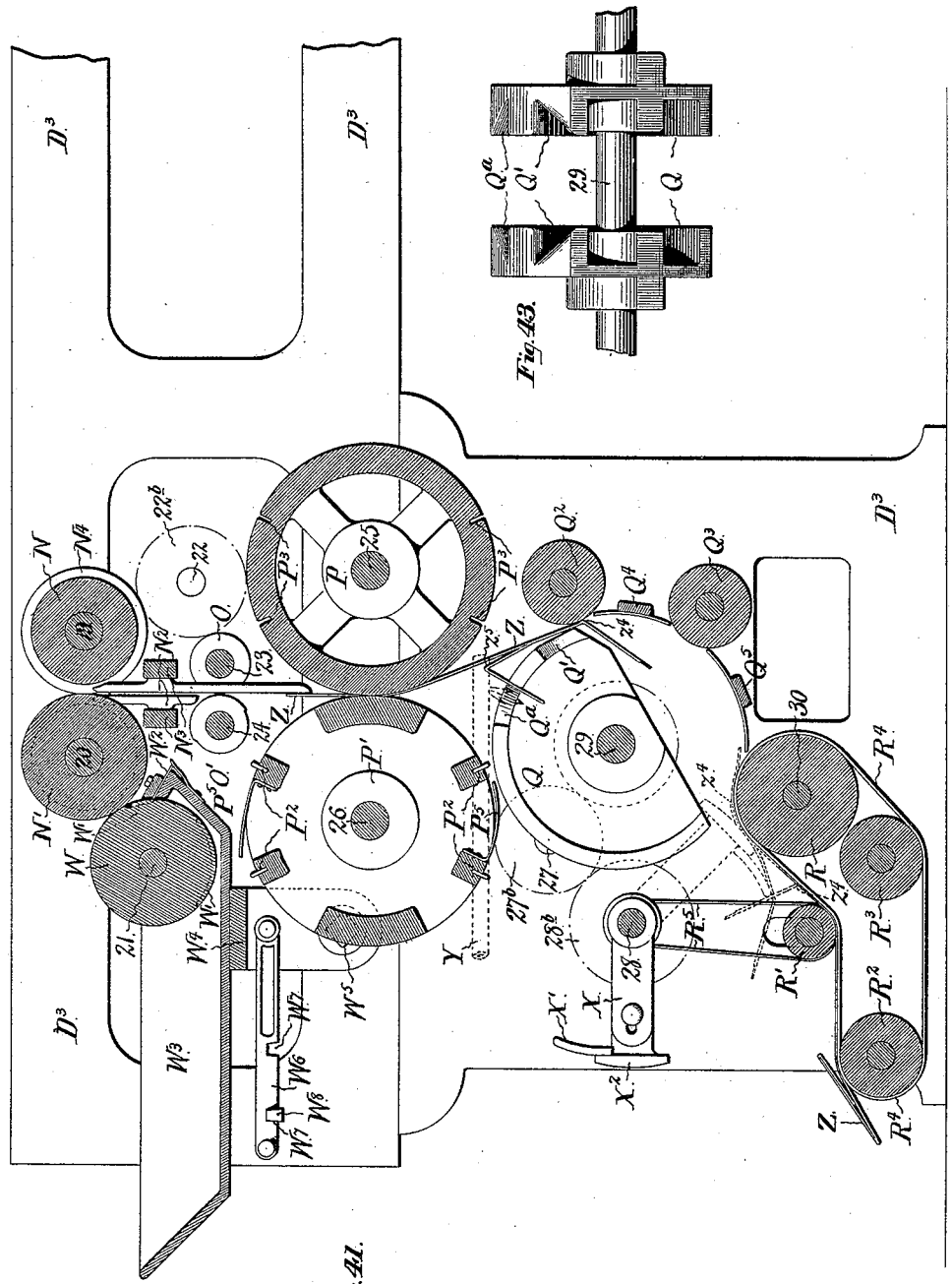
Figure 57:
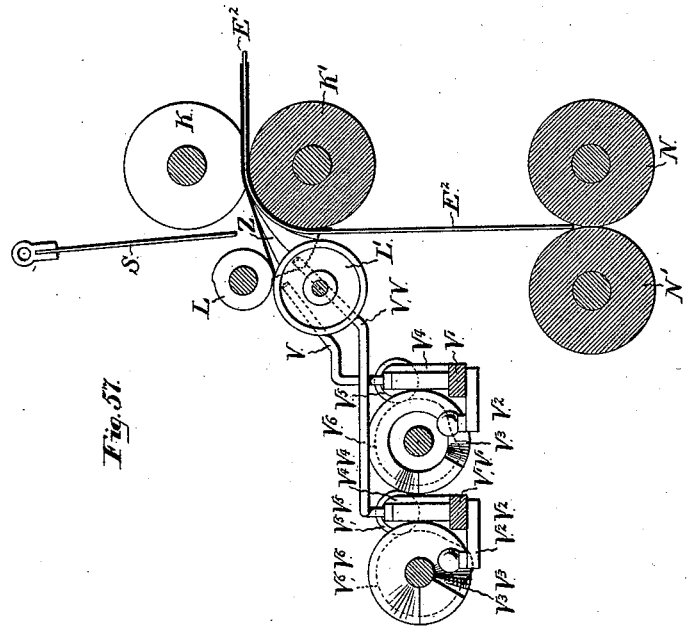
Figure 58:
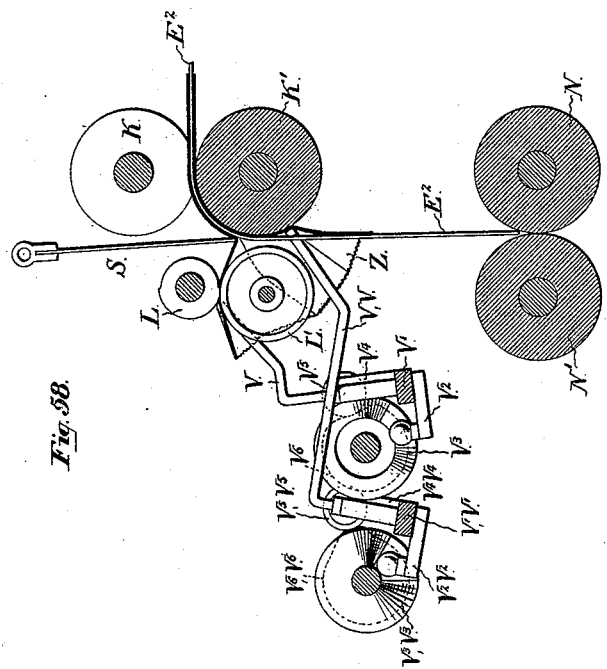
Figure 67:
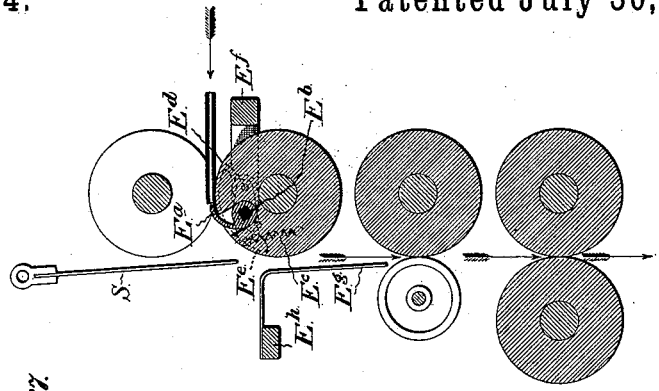
Figure 68:
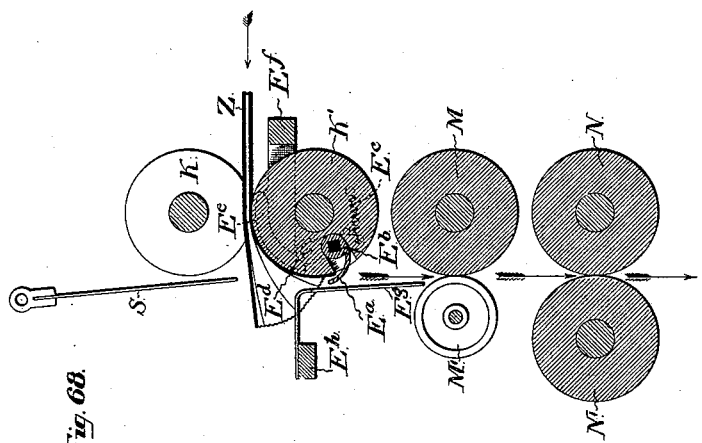

Figures 1 to 14 represent the various folds made in the blank in the process of making the bag. Fig. 15 is a side view, partly in section, of the mechanism by which a roll of paper is converted into a bellows-folded tube; Fig. 16, a plan view of the same mechanism shown in Fig. 15. Fig. 17 is an elevation, partly in section, showing the mechanism by means of which the tube after being formed is first cut into blanks of the desired form and then opened up at one end into the diamond or truncated diamond form before referred to. Fig. 18 is a plan view of the same mechanism shown in Fig. 17. Fig. 19 is a front view of that part of the machine shown in Figs. 17 and 18. Fig. 20 is an enlarged plan view of the distending rods or fingers which I use in opening out the end of the tube, the folder-plates which I use to compress the diamond and hold it in shape after it has been formed, and the mechanism by which these fingers and plates are actuated. Fig. 21, Sheet 8, is a view of the same portions of the machine, showing them, however, in a different position from that occupied in Fig. 20. Fig. 22 is a side view of one of the distending-fingers and its immediate connections; Fig. 23, a similar view showing a modification in the way in which the finger is attached. Fig. 24, Sheet 7, and Fig. 25, Sheet 8, are side views of the cams by which the distending-fingers are actuated. Figs. 26, 27, and 28 are respectively top, edge, and front views of the side folder-plates. Fig. 29 is an enlarged front view of those portions of the machine which operate to open and distend the bottom of the blank in the diamond form, the mechanism being here shown as in the position it occupies just before the distending-fingers are actuated. Fig. 30 is a similar view showing the mechanism in the position it occupies when the distending-fingers have performed their function in opening up the bottom of the tube. Fig. 31 shows the same parts of the machine in the position they occupy when the vertically-moving folder-plate has performed its function and the diamond is practically brought to form. Fig. 32 again represents the same portions of the machine at the stage of their operation when the side folder-plates are in operation to press and hold the diamond in shape. Fig. 33 is a side view of the upper part of the mechanism shown in Fig. 29 in the position it there occupies; Fig. 34, a similar view showing the position of the mechanism as in Fig. 30; Fig. 35, a similar view showing the mechanism in the position it occupies in Fig. 31, and Fig. 36 shows the parts as they are in Fig. 32. Fig. 37 is an enlarged front view of the roller K', which performs an important part in the opening of the diamond, this view showing the gripping-fingers, which are attached to and operate upon this roller, and the cams which operate them, in their open position. Fig. 38 is an end view on the line $y\ y$ of Fig. 37. Fig. 39 is a view similar to Fig. 37, showing the action of the cams on the gripping-fingers, which are here shown in the position they occupy when gripping the paper upon the roller K'; and Fig. 40 is an end view on a section $z\ z$ of Fig. 39. Fig. 41 is a sectional elevation of the mechanism by which I fold down the two final flaps to form the bottom of the bag; Fig. 42, a front view of this part of the machine; Fig. 43, a back view of the roller Q of Fig. 41. Figs. 44 to 47, inclusive, are views of a modification of the distending-fingers heretofore referred to; Figs. 48 to 52, inclusive, views of still another modification of this part of the machine; Figs. 53 and 54, views showing this last modification in connection with a bag-blank and the rollers K K'. Figs. 55 and 56 are plan views, a modification in which two coacting pairs of distending-fingers are used to open the bag-blank; Figs. 57 and 58, side views of the modified device shown in Figs. 55 and 56. Figs. 59 and 60 are side views of another modification of my improved bag-machine; Figs. 61 to 66, details of the mechanism shown in Figs. 59 and 60; and Figs. 67 and 68 are side views illustrating still another modification which may be made in my machine.

Referring first to Figs. 15 and 16, A is the roll of paper from which the bellows-folded tube is to be made, A' representing the paper as it leaves the roll and passes to and over the formers which make it into a tube.

$A^2$ are cones which sustain the roll A and keep it in position; $A^3$, guides which center the roll A, and $A^4$ the pivoted supports for the guides $A^3$.

B and C are guide-rollers for directing the paper; C', a paste-wheel for applying a line of paste to one edge of the paper as it passes over the guide-roll C, $C^2$ being the paste-box, $C^3$ the table which supports said box, and $C^4$ a rock-shaft by which the paste-box and roller are held in correct position with respect to the guide-rollers C.

D is a table which supports the devices by which the web A' is formed into a bellows-folded tube; D', braces supporting $D^2$ and D; $D^2$, brackets on which the table D is supported on the braces D', and $D^3$ and $D^4$ the main frame of the machine.

E is the support to which are secured the former-plates E' $E^2$, the said support E being made adjustable, as shown, by means of slots and bolts.

F F are adjustable upright guides which fold the web A' around the edges of the former E'.

F' are guide-disks which direct the sides of the blank between the formers E' and $E^2$.

$F^2$ are fingers for directing the upper edges of the web A' into proper position above the former $F^2$.

$F^3$ $F^3$ are rotating guide-disks operating between the formers E' and $E^2$, as shown.

$F^4$ $F^4$, Fig. 18, are additional guide-disks which I prefer to use.

G G' are pressure-rolls which act, together with the prolonged former $E^2$, to compress the bellows-folded tube after it has been formed by the above-described mechanism.

Passing next to Figs. 17 and 18, which will at once be seen to show those portions of the machine which lie in front or beyond the tube-former proper, H H' are feed-rollers journaled on the shafts 4 and 3.

I I' are feed-rollers carrying knives $I^2$ $I^2$, which operate on the center of the tube, and are arranged to cut a lip at the center, as is quite customary in making blanks. The particular construction of these knives, as indicated in the drawings, need not be here explained, as it will form the subject of another application for a patent, and, so far as the present invention is concerned, they could be replaced by any of the well-known cutters for doing similar work. I wish, however, to call attention to the fact that these cutters operate in connection with an opening $e$ in the prolonged former $E^2$, said former being broadened out, as shown at $e'$, so that its perforation may have the requisite breadth here slightly greater than the breadth of the plate itself in this part of the machine.

J J' are feed-rollers provided with knives $J^2$ and slots $J^3$, said knives and slots acting on each side of $E^2$ to completely sever the tube into blanks of the desired length, the knives $I^2$ $I^2$ having previously severed the tube at its center.

K K' are the feed-rollers which deliver the blanks to the mechanism which opens and spreads out their bottoms, and of which mechanism the roller K' is in my preferred construction an important constituent. The roller K' has a plain cylindrical face, as shown, while the roller K is made up of two disks and does not touch the roller K' at the center.

With the exception of some novel functions performed by the roller K', the mechanism of the machine up to this point has no essential relevancy to my present invention, and might be replaced by any of the many well-known forms of mechanism by which a web of paper is formed into a bellows-folded tube and such tube cut up into bag-blanks of the required size and form.

It will be noticed that the former $E^2$ is continued throughout the whole length of the mechanism heretofore described, and by reference to Fig. 17 and the other drawings showing this part of the machine it will be seen that the end of the former passes over the top of the roller K′ and, conforming closely to its outline, curves downward. Over the top of the former, where it passes over the roller K′, is a guide E³, fastened to the support E⁴.

To refer next to the immediate connections of the roller K′, K² K² are stationary cams at each end of said roller, said cams being supported on the axis 11 and held stationary by the supports K³. (Best seen in Fig. 17.)

K⁵ K⁵ (see Figs. 37 to 40) are gripping-fingers pivoted in line with each other on the outer edge of the roller K′, K⁶ K⁶ being clamping-plates for holding the fingers in position; K⁴ K⁴, rollers attached to the fingers in such a way as to rest against the cam-surfaces of K², and K⁷ K⁷ are springs which act to hold the rollers K⁴ against the cam-surfaces K².

The action of the cams K² in connection with the fingers K⁵ is clearly shown in Figs. 37 to 40, inclusive.

L L′ are feed-rollers, of which L is secured to and turns with the shaft 14, while L′ (see Fig. 17) is supported on the end of a lever L², pivoted at L³ and pressed upward by means of a spring L⁴, the upward motion of the lever L² and the roller L′, which it supports, being limited and regulated by a set-screw L⁵.

It will be noticed that a portion (about one-half, as shown in the drawings) of the surface of the upper roller L is cut away, so as to be lower than the remaining one-half of the surface. In this way, by a proper adjustment of the set-screw L⁵, the rollers L L′ are made to alternately tightly grip the paper between them and release their grip upon it. The release, of course, need not be entire. In fact, it is desirable that there should always be some pressure between the two rollers.

M and M′ are feed-rollers, M being secured on the shaft 15, and M′ turning by frictional contact. The roll M has a broad plain face of greater width than the bag-blank, while the roll M′ is narrow and rests upon the center of the plain surface of roll M.

M² is a flat plate arranged so that its surface will be substantially in line with a vertical tangent to the surface of roll M.

N N′ are rollers which serve at the same time to apply paste to the diamond after it has been formed and feed it forward to the mechanism which makes the final folds.

To return, however, to those parts of mechanism by which the diamond is formed during the progress of the blank from between the rolls K K′ until it is engaged by the rolls N N′, V V (best shown in Figs. 22 and 23) are distending rods or fingers, the shanks of which pass through an oscillating bar or rock-shaft V′, in which they are free to turn.

V² are rollers attached to arms springing from the base of the fingers V.

V³ V³ are cams secured on a rotating shaft 17, so as to rest against the rollers V² and, through said rollers, cause the fingers V to turn in their bearings on the rock-shaft V′ from the position shown in Fig. 20 to the position shown in Fig. 21.

V⁴ is an arm attached to and projecting upward from the rock-shaft V′; V⁵, a roller journaled in the arm V⁴.

V⁶ is a cam on shaft 17, against which the roller V⁵ rests, and by which the rock-shaft V′ is caused to oscillate at proper times.

V⁷ V⁷ are the bearings of the rock-shaft V′.

V⁸ is a spring which acts to keep the roller V⁵ in contact with the cam V⁶.

S is a folder-plate or tucker; S′, a link connecting the upper edge of the tucker S with the lever-arm S², which is secured to the rock-shaft S³.

S⁴ is an arm, also secured to rock-shaft S³ and carrying at its lower end a roller S⁵, which rests against a cam S⁶, on shaft 9, said cam acting through the roller-arm S⁴, shaft S³, arm S², and link S′, serving to raise and lower the tucker S at proper times.

T T are guides for the tucker S. They are attached to a rock-shaft T′, from which extends an arm T², carrying at its end a roller T³. This roller rests against the cam T⁴ on the shaft 12, and said cam regulates the angular position of the guides T and the tucker S, which they support.

U U are folding wings or plates, the form and construction of which are best seen in Figs. 26 to 27. They are supported on that part of the frame-work of the machine marked D⁴, on journal-pins which pass through the holes U′. (See Fig. 21.) U² are roller-arms attached to these folding-wings, and U³ rollers journaled on the arms U². These rollers are inserted in the cam-groove U⁴ of cams U⁵, and said cams are secured on the rotating shaft 19.

Before explaining the action of the above-described parts in opening the bottom of the blank I will point out the gearing by which, in the machine shown in the drawings, the different operative devices are actuated.

1 is the driving-shaft; 1ᵃ, a gear-wheel secured to this shaft and meshing with an intermediate wheel 2ᵃ on shaft 2. This wheel engages with a wheel on shaft 3, which is of the same size and lies directly under the wheel 4ᵃ on shaft 4, with which wheel it engages to drive the shaft 4, the feed-rolls H H′ being thus actuated with equal velocity. 2ᵃ also engages with the wheel 5ᵃ on shaft 5, a second wheel 5ᵇ on this shaft engaging a wheel 6ᵇ on shaft 6 to rotate the cutter-rolls I I′. The wheel 5ᵇ engages intermediate wheel 7ᵇ on shaft 7, and this wheel engages with a gear-wheel on shaft 8 of the same dimensions and directly under the wheel marked 9ᵇ on shaft 9, said wheel 9ᵇ being driven by the corresponding gear on shaft 8, and the cutter-rollers J J′ are thus driven with uniform velocity. The gear-wheel on shaft 8 engages with the wheel $10^b$ on the intermediate shaft 10, and this gear-wheel $10^b$ actuates the roller K′ by engaging with a wheel on shaft 11, said wheel having the same dimensions and lying directly under $12^b$ on shaft 12, $12^b$ being driven by the wheel on shaft 11, so that the rollers K and K′ have the same velocity. The gear-wheel $12^b$ engages with the intermediate wheel $13^b$ on shaft 13, and $13^b$ engages a wheel $14^b$ on shaft 14, so as to drive the roller L. The intermediate gear $10^b$ also engages a gear-wheel $15^b$ on shaft 15 and drives the roller M, said wheel $15^b$ also meshing with an intermediate gear $16^b$ on shaft 16, which in turn engages the gear $17^b$ on shaft 17 and actuates said shaft and the cams situated upon it. The gear $15^b$ engages an intermediate gear $18^b$ on shaft 18, said gear-wheel engaging with a gear on shaft 19 of the same dimensions as $15^b$, and the gear on shaft 19 meshing with a similar gear-wheel on the shaft 20.

I prefer to make the train of gears which actuate the mechanism in front of the rollers H H′ operate to move the rollers in front of H H′ slightly faster than they move, so as to put a slight tension on the paper between H H′ and J J′. The surface velocities of the rollers I I′, J J′, K K′, L, M M′, and N N′ are substantially the same, though I have found it advantageous to make the velocity of the surface of the roller L slightly greater than that of the rest of the train, so as to put some little tension on the bag-blank at that point. The shaft 17 must move with the same angular velocity as the shaft 11, carrying the roller K′.

The system of gearing to which I have above referred can of course be varied in many ways, and of course so long as the proper sequence of motion is preserved between the various operative parts it is entirely immaterial how they are geared and connected together to have this sequence.

I have already pointed out how the tube is prepared and cut into blanks, and, as the drawings show, as soon as the blanks are completely separated from each other they pass between the rollers K K′. As they pass from between these rollers, the extension of the former $E^2$, which lies within the blank, bends down the lower or under side of the blank, while the upper side is guided by the plate $E^3$ between the rollers L L′, as is shown in Figs. 29 and 33. The upper side of the paper is then gripped between the rolls L L′ and drawn forward by them. The gripping-fingers $K^5$ $K^5$, pivoted on the roller K′, are so arranged with relation to the stationary cams $K^2$ $K^2$ that they will move inward and clamp the edges of the bottom of the blank to the roller at the points where the corners of the bottom of the bag are to be formed, and the distending-fingers V, which, as the upper side of the blank passes between the rollers L L′, lie in the position shown in Figs. 29 and 33, are so arranged with relation to the cams $V^3$ $V^3$ and the cam $V^6$ that they will open and rock backward into the position shown in Figs. 30 and 34 when the blank has been fed forward sufficiently to make the points of the fingers V engage the corners of the blank at or a little back of the points where the corners of the bottom are to be formed in the upper fold of the blank. At the point in the movement of the machine indicated in Figs. 30 and 34 the bottom of the bag is thus defined: its corners on the lower side of the blank being defined by the line on which the fingers $K^5$ $K^5$ catch it, and its corners on the upper side of the blank defined by the points where the fingers V V rest on the inside of the blank.

By giving the distending-fingers the double motion described I am enabled to engage the corners of the blanks with greater uniformity and precision, the motion backward, or, more accurately, in the direction of the motion of the blank, insuring that the engagement of the fingers with the tube shall not be too close to the end of the blank at the time when said blank is being distended.

I will also note here that it is not essential that the fingers $K^5$ should actually clamp the paper against the roll K′. Indeed, the said fingers will fully serve their purpose if they merely define the corners $z^4$ $z^4$ by lying on the under side of the tube at these points without pressure, for the fingers V V, in connection with the curved end of plate $E^2$, will practically effect the distention of the tube, though without some means of defining the corners $z^4$ $z^4$ they could not be depended on to bring said corners into the same transverse plane with corners $z^5$ $z^5$. While, therefore, I shall hereinafter refer to $K^5$ $K^5$ as "gripping-fingers," it must not be understood that I mean thereby to limit myself to fingers which clamp the paper against the roll K′.

The tucker S is actuated so that it will move down and engage the top of the blank issuing from rolls K K′ on the line $z^2$, where the upper side of the blank is folded back on itself in the completed bag. Between its positions, as shown in Figs. 33 and 34, the tucker S, as the blank advances, moves down, engaging the blank first in about the position shown in dotted lines in Fig. 33, and then being so guided that its edge will practically follow the conformation of roller K′ and move with the same speed. The effect of this is that when the blank is in the position shown in Fig. 34 its front upper side is just changing its forward for a backward motion between rolls L L′, and is virtually standing still at the time when the distending-fingers operate to distend the tube, and the position of the tucker is such as to prevent the distention of the tube from extending too far back and to cause the folds to fall naturally into the desired lines. At this point the recessed portion of the roller L comes above the roller L′, and said rollers therefore release the tight grasp which they have heretofore had upon the upper side of the blank, and the tucker S, moving downward from the position shown in Figs. 30 and 34 to that shown in Figs. 31 and 35, draws the upper side of the blank from between the rollers L L', the roller L' of course being narrower than the distance between the side folds $z'$ $z'$ of the diamond, as shown in Fig. 4. As shown in Figs. 34 and 35, the end of the lower side of the blank is seized between the feed-rollers M M' and drawn forward while and after the tucker S is moving from the position shown in 34 to that shown in 35, the roller M', like the roller L', being narrower than the distance between the side folds of the diamond. The spreading-fingers V V close or begin to close immediately after the mechanism is in the position shown in Figs. 34 and 30. Their closure may be so arranged that their points will follow the two converging lines of the upper fold of the diamond and help to bring these lines into shape, although this action is not essential. The fingers $K^5$ $K^5$ on roller K' also move back from their position over the edges of the under side of the blank as the machinery advances from the position shown in Fig. 34, the diamond being completed by the coaction of the roller L', tucker S, and rolls M M', which, the paper having been drawn into the position shown at Z in Figs. 30 and 34, pull it in such a way as to cause it to naturally fall into the desired diamond shape. Before the tucker S has completed its downward motion the side folders or wings U, which during the first part of the operation of spreading open the bottom have remained in the position shown in Figs. 30 and 33, are caused to close inward by their cams $U^5$, thus flattening out the diamond until they rest against the blank, as shown in Figs. 31 and 35, pressing the diamond lightly against the tucker S, the roll M, and the plate $M^2$. While these side folders remain in this position the tucker S is withdrawn and the blank fed forward into the position shown in Figs. 32 and 36, the diamond being held to shape by the pressure of the wing-folders U until it is engaged by the feeding and pasting rollers N N'.

It will be observed that by the method of opening and forming the diamond on the end of the blank above described the paper falls easily into the desired lines of fold and is not subjected to any undue strains at any point or on any line. The mechanism by which the paper is led to fold itself on the proper lines as it advances through the machine is all of it simple and easily constructed, and all parts which have a reciprocating motion, or which move faster than the main feeding-rolls, are exceedingly light, so that the machine is exposed to no shocks and can be made to work with great rapidity.

The distending-fingers V and the grippers $K^5$ on roll K' coact together in such a way that the points at which they touch the blank just before the distending-fingers begin to close and the grippers to move from over the lower side of the blank will be distant from each other by nearly the breadth of the side of the bag. They coact, therefore, to distend the tube on the plane of the bag-bottom, and as the tucker prevents the distention of the blank from extending back of the line $z^2$, which it defines, this distention causes the paper to bend in curves which approximate in position to the lines which define the triangular folds, (marked $z$ $z$ in Fig. 4). The downwardly-bent end of the former-plate $E^2$ pulls down the front point of the diamond, so that at the time when the distending-fingers and grippers release their hold upon the blank it has already begun to assume the diamond shape, the folds $z'$ $z'$ being to some degree bent inward in the direction of their final position, and as the tucker S continues its downward motion and the side of the blank resting over roll L' is drawn backward the longitudinal extension of the distended end of the tube is continued and the side folds $z'$ $z'$ move gradually downward toward their final position, as shown in Fig. 4, the narrow feed-roll M' coacting with roll L' to bring the diamond into shape, but, as will be hereinafter explained, not being essential. As the diamond flattens out, the curved folds, which, as I have stated, were originally made on approximately the lines of the triangular folds $z$ $z$, are flattened and compacted together, so that when the hinged or wing folders U U come into play all the lines of the diamond are so nearly defined that only a slight pressure is needed to crease the paper into the proper permanent folds and deliver it to the rollers N N' to be further compacted and provided with the proper lines of paste.

The particular construction and arrangement of the mechanism for opening one end of the blank and spreading it out into the diamond form which I have described and illustrated in the drawings is in my belief the best form in which I have embodied or contemplated embodying my invention. Many of its features, however, are capable of extensive modification, and some parts may be dispensed with entirely. For instance, the rollers L L' may be replaced with a stationary or movable plate for supporting the top of the blank above the distending-fingers, or the fingers themselves may be made to serve the purpose of said rollers, and the shape of the fingers and the mechanism for actuating them are capable of almost indefinite variation.

In Figs. 44 to 47, inclusive, I have illustrated a modification which will be readily understood. The fingers (here marked $V^a$) are pivoted upon a rock-shaft marked $V'^a$, which shaft also carries a plate which I have marked VL, said plate being so placed that the fingers $V^a$, in moving toward each other, would pass underneath it to the position indicated by the dotted lines in Fig. 44. $V^{2a}$ are rollers secured on the ends of the fingers $V^a$, and $V^{5a}$ is a cam secured upon the rock-shaft $V'^a$, by the rotation of which the rock-shaft, with its fingers and plate VL, moves from the position shown in dotted lines in Fig. 45 to that shown in full lines. A properly-formed cam-surface in or against which the rollers $V^{2a}$ rest will cause the fingers $V^a$ to move outward to the position shown in Fig. 44 as the rock-shaft and its plate VL are moved outward. It will at once be recognized that the fingers arranged in this way have a very similar motion to the fingers shown in the other drawings and will act to distend the tube in the same way, and it will also be apparent that the plate VL will serve the purpose of the roller L' in drawing out the back end of the diamond as the blank moves backward over it after the blank has been distended and the fingers closed together.

Still another modification is illustrated in Figs. 48 to 54, inclusive. The distending-fingers in this construction I have marked $V^b$. They are pivoted upon a block $V'^b$, which remains stationary and have an annular flange, as shown, between which and the block $V'^b$ a plate $v$ is situated. The spindles of the fingers $V^b$ pass through slots $v^b$ in the plate $v$, and the annular flanges of the fingers are slotted, as is shown at $V^{2b}$, so as to engage projections $V^{3b}$ on the plate $v$. Plate $v$ is given a backward and forward motion by means of any convenient gearing, Fig. 48 showing it in its forward position, and Fig. 49 showing it in its backward position, its connection with the fingers $V^b$ causing them to move from the position shown in Fig. 48 to the position shown in Fig. 49 as it moves backward, and of course moving the fingers from the position shown in Fig. 49 to that shown in Fig. 48 as it moves forward. These fingers are placed with respect to the rollers K K' as is shown in Fig. 53, and the blank is delivered over said fingers in the manner shown in this figure until when it is moved forward sufficiently the plate $v$ moves backward, when the fingers are thrown into the position shown in Fig. 49, distending the blank in the way indicated in Fig. 54, after which the fingers are moved back to the position shown in Figs. 48 and 53 and the blank then drawn backward over the points of the fingers, which of course in this position answer the same purpose as the roller L or the plate VL in bringing the diamond into form. When the roll L', or a plate such as VL, is used to support and guide one side of the blank, I prefer that the ends of the fingers should lie beneath it when in their forward position, the rim of the roll or edge of the plate being shaped, as shown, to permit of this.

For the purpose of clearly defining the scope of my invention, I have in Figs. 55 to 62 illustrated a number of modifications in the mechanism for opening the mouth of the blank for distending it and for drawing out the diamond. Many of these modifications being alternative to devices claimed are not for that reason specifically claimed in this application, but will be made subject-matter for subsequent applications. In Figs. 55 to 58 I have illustrated a substitute for the gripping-fingers $K^3 K^3$, consisting of a second pair of distending-fingers, which, like those before referred to, act upon the inside of the tube, and, like the grippers $K^3$, coact with the fingers V V in distending the blank on the plane of the bag-bottom. In Figs. 55 and 57 I have illustrated the double distending-fingers in the position they occupy when receiving the advancing blank from the rolls K K', and in Figs. 56 and 58 I have shown them in the position they occupy when acting to distend the blank. The second pair of distending-fingers are marked V V V V, and the rock-shaft in which they are journaled V' V'. The arms corresponding to arms $V^2$ of the upper fingers are marked $V^2 V^2$, the cam which reciprocates them $V^3 V^3$; the arm on the rock-shaft $V^4 V^4$ the roller carried by said arm $V^5 V^5$, and the cam which moves the rock-shaft is marked $V^6 V^6$. In all respects the actuating devices for the lower fingers are, as shown, similar to those of the fingers V, and it will at once be seen that with respect to the fingers V, the tucker S, and the rest of the mechanism for forming the diamond the fingers V V are the equivalents of the grippers $K^3$, which I prefer to use. I have mentioned before that the rolls M M' are not essential, and in Figs. 57 and 58 have shown the end of the prolonged former $E^2$ as extending down to the pressing-rolls N N'. It will be apparent that the narrow plate $E^2$ will, in connection with the roll L or a narrow support such as I have already described, act to draw out the ends of the distended blank to the diamond form, just as, though perhaps not so well as, the roll M'.

In Figs. 59 to 66 I have shown another modification of the device for distending the tube, in which, instead of using the distending-fingers V V to engage the corners of the upper side of the blank, I employ external grippers, which are caused to engage the blank at the proper points to move with it sufficiently far to coact with the fingers $K^3 K^3$ in distending the blank, and then to release the blank.

$V^k$ is a bearing-shaft, on which I suspend an oscillating frame $V^{k'}$, having tubular extensions $V^{k2}$, arranged at a distance apart somewhat greater than the breadth of the bag-blank. At the top of the tubular extensions $V^{k2}$, I form cams $V^{k3}$.

$V^{k4} V^{k4}$ are rods passing through the tubes $V^{k2}$ at their upper ends. Cam-surfaces $V^{k6}$, corresponding with cams $V^{k3}$, are formed, and arms $V^{k5}$, firmly secured to the rods, extend out at right angles to them. At the ends of arms $V^{k5}$ rollers $V^{k8}$ are secured, and a spring $V^{k7}$ is provided to hold the said rollers in contact with cams $V^{k10}$, secured on a shaft $V^{k9}$, which is actuated by gearing from the machine, as indicated by the dotted lines in Figs. 59 and 60. The cams $V^{k16}$ act through arms $V^{k5}$ on the rods $V^{k4}$, causing them to have a reciprocating rotation in the tubes $V^{k2}$ and at the same time to move longitudinally up and down therein, owing to the conformation of cams $V^{k3}$ and $V^{k6}$. Another cam-surface $V^{k11}$ on shaft $V^{k9}$ acts on a roller $V^{k12}$, secured to frame $V^{k\prime}$, giving it a reciprocating oscillation on its bearing-shaft $V^k$. Jaws $V^{k13}$ are secured at the end of tubes $V^{k2}$ on rods $V^{k4}$, and spring jaws or grippers $V^{k14}$ are attached to the end of said rods by being clamped between jaws $V^{k13}$ and pins $V^{k15}$ on the ends of rods $V^{k4}$, as shown.

The operation of the device is easily followed. The cam $V^{k11}$ throws the frame $V^{k\prime}$ forward into the position shown in Fig. 59, where the jaws $V^{k13}$ lie above and the open spring jaws or grippers below the upper side of the blank Z as it advances from rolls K K$^\prime$. At the point where cam $V^{k11}$ allows the frame to move away from rolls K K$^\prime$ the cams $V^{k10}$ act on the arms $V^{k5}$ and cause the rods $V^{k7}$ to turn and move upward, thus simultaneously moving the jaws $V^{k13}$ inward and the grippers $V^{k15}$ inward and upward, so that they will pass beneath the edges of blank Z and clamp the corners of its upper side against the jaws $V^{k13}$, which lie above said blank. The frame then moves forward to the position shown in Fig. 60, the grippers $V^{k14}$ holding the upper corners of the blank, while at the same time its lower corners are drawn down by grippers $K^3$ and the blank thus distended as before. When the distention is effected, the cams $V^{k10}$ allow the rods $V^{k2}$ to revolve outward and move downward, thus releasing the blank. The tucker S and the mechanism for drawing out the diamond are in no wise affected by the use of the above-described modification of the distending device, and the general character and mode of operation of the machine are the same as where my preferred distending device is used.

In Figs. 67 and 68 I have shown a device for opening the blank as it passes through the rolls K K$^\prime$, which enables me to dispense with the bent plate $E^2$ and takes its place with respect to the rest of the diamond-forming mechanism. In these drawings, $E^a$ is a clamping-finger secured in a central cavity in roll K$^\prime$, so that its outer edge will in one position lie against the center of the roll-face, as shown in Fig. 67. This clamping-finger is secured on a shaft $E^b$, which is journaled in roll K$^\prime$ and has on its outer end and to one side of the roll an arm, to one end of which is secured a cam-roller $E^d$, while to another end is secured a spring E, which acts to draw the end of finger $E^a$ away from the surface of roll K$^\prime$. On a support $E^f$, I secure a cam $E^e$, of such form and so placed that the roller $E^d$ will come in contact with and move along it for a determined distance, its action being to move the clamping-finger forward, so that it will grip the top of roll K$^\prime$. This cam is placed so as to cause the finger $E^a$ to clamp the lip of an advancing blank Z on the surface of roll K$^\prime$ and to open its mouth as the roll moves forward, as is shown in Fig. 68.

It will be at once seen that, so far as the opening of the mouth of the blank is concerned, the clamping-finger acts in the same way as the curved plate $E^2$, and to supplement the clamping-finger in drawing out the lower end of the blank to a diamond form I secure a narrow guide-plate $E^g$ on a support $E^h$, said plate serving the purpose of the prolonged end of $E^2$ in its drawing-out function.

As to the tucker S, it is of course important that it should move so as to engage the blank at a proper time and in the proper line. It is also important that it should move downward or with the blank for a sufficient distance to definitely define the fold $z$; but the mechanism for guiding and operating this tucker which I have shown in the drawings is given simply as one way, and I believe a very good way, of imparting the required motions, and could be varied and modified very greatly by any mechanic of ordinary skill.

The side or wing folder-plates U U are simple and convenient devices for holding the diamond in shape as it passes to the pressing and pasting rolls N N$^\prime$. They are not, however, essential, as their place could be, to a certain extent at least, supplied by stationary guides. It is of course evident that these folder-plates could be actuated from other points of the machine than the shaft 19, and that while for simplicity and compactness it is advantageous to have them move on axis parallel to the plane of the diamond they could have their axis on other lines, if desired.

Passing next to those portions of the machine shown in Figs. 41, 42, and 43, and by which the bag is completed ready for use, N N$^\prime$ are, as I have already stated, rollers between which the diamond is compressed and by which lines of paste are applied to the diamond.

W is the paste-roll, secured on shaft 21, so as to be within the paste-trough $W^3$. The shaft 21 and paste-box $W^3$ are pivoted by supporting-arms $W^4$ on the studs $W^5$, and the roll W is held against the roll N$^\prime$ by an elastic pressure.

$W^6$ is a latch for holding the arms $W^4$ in position, $W^7$ $W^7$ notches in the latch-arm $W^6$, and $W^8$ a boss on the frame $D^3$ with which the notches $W^7$ engage. The roll W has grooves $W^\prime$ cut in its face to hold paste, said grooves being of the size and form of the lines of paste to be applied to the diamond of the blank.

A scraper $W^2$ serves to remove the paste from the plain surface of the rolls W, leaving the grooves $W^\prime$ full to the brim. As the roll W revolves in contact with roll N$^\prime$, lines of paste are, as it may be said, printed on the face of roll N$^\prime$ and are conveyed by it to the diamond of the blank as it passes between the rolls N and N$^\prime$.

$N^2$ are guides between which the compressed blank passes after leaving the rolls N N'.

$N^3$ are supports for the guides $N^2$, and at $N^4$, I have indicated a groove in the rollers N and N', which permits the top of the guides $N^2$ to extend to or nearly to the point of contact of the rolls.

O O' are feed-rollers mounted on shafts 23 and 24.

P P' are creasing-rolls mounted on shafts 25 and 26.

$P^2 P^2$ on roll P' are creasing-blades, and $P^3 P^3$ on roll P are grooves into which the blades $P^2$ enter.

$P^5 P^5$ on roll P' are springs.

Q is a segmental roller mounted on shaft 29 and having the peculiar form illustrated in Figs. 41 and 43—that is, it is made up of two segmental disks, the inner sides of which are distant from each other by less than the breadth of the bag-blank, and are provided with recesses $Q^a Q'$ near the forward or advancing end of their segmental peripheries. The angular velocity of Q is double that of the rolls P P'.

$Q^2 Q^3$ are guide-rolls, $Q^3$ also serving as a feed-roll.

$Q^4$ and $Q^5$ are guide-plates.

R, R', $R^2$, and $R^3$ are rollers around which the apron $R^4$ moves. The roller R is mounted on the shaft 30 and communicates motion to the apron.

$R^5 R^5$ are tapes which pass around the roller R' and around pulleys on the shaft 28. The inner edges of these tapes are closer together than the breadth of the bag-blank.

X is a revolving arm mounted on the shaft 28 and having at its end the forked arm X' and segmental presser-plate $X^2$.

Y is a pipe having at its end a perforation or nozzle, so that a blast of air passing through the pipe will escape as a jet in the direction indicated by the arrows in Fig. 41.

The gearing by which the aforesaid operative parts of the machine are actuated is easily followed on Figs. 41 and 42. The gear-wheel $20^\times$ engages the gear-wheel $21^\times$ on shaft 21, so as to communicate to the roller W a rotation which will give it the same velocity as that of the roller N', with which it is in elastic contact. Another wheel $20^b$ on shaft 20 engages an intermediate wheel $22^b$ on shaft 22, said intermediate wheel meshing with the wheel on shaft 23, of the same dimensions as the wheel $24^b$, (shown in Fig. 42,) with which it engages, so as to rotate the shafts 23 and 24 with the same velocity, and through them the feed and presser wheels O and O'. Intermediate wheel $22^b$ also engages a wheel on the shaft 25, of the same dimensions as the wheel $26^b$ on the shaft 26, the wheels on shafts 26 and 25 being also engaged so as to rotate the two rollers P and P' with the same speed, said speed being such that the angular velocity of the shafts 25 and 26 will be half that of the rolls N N'. The gear-wheel $26^b$ engages with the wheel $27^b$ on the stud 27, and this wheel engages the wheel $29^b$ on shaft 29, so as to rotate the segmental roller Q with a surface velocity double that of the rollers P P'. The intermediate wheel $27^b$ also engages a wheel $28^b$ on shaft 28 to rotate the arm X. The segmental presser-plate $X^2$ should move with about the same velocity as the apron $R^4$. A gear-wheel $29^c$ on shaft 29 engages with a gear $30^c$ on shaft 30 to rotate the roller R, which drives the belt $R^4$.

Of course the above system of gearing can be modified and changed in any desired way without in any way affecting the operation of the operative parts of the machine.

These parts of my machine operate upon the bag-blank as follows: The blank, as I have already explained, is compressed and has lines of paste applied to its diamond while passing through the rolls N N'. After leaving these rolls it passes between the guides $N^2$ and between the rollers O O', which deliver it to the rolls P P'. These rollers have double the diameter of the rolls N N', so that two blanks pass between them for each complete revolution, the creasing-blades $P^2$ and grooves $P^3$ being placed so that they will crease the diamond on the lines of the two final folds $z^5$ and $z^4$. The springs $P^5$ serve to push the blank in the direction of the axis of the roll P as it passes from between the rolls P P', so that it will be presented to the segmental roller Q in the proper direction, as indicated in Fig. 41. It will be at once seen that the segmental roll Q cannot engage the points of the diamond, which are delivered to it with the forward end of the diamond slightly in advance of the advancing edge of its periphery. The position of the roll Q is such that the angular slots $Q^a$ will come about to the position shown in Fig. 41 at the time when the air-blast from pipe Y strikes the back point of the diamond, the blast blowing down this point of the diamond, as shown in Fig. 41, so that its outer edges rest against the front edge of the angular slot. As the roller Q has a surface speed twice as great as the motion of the blank at this point, the back edge of the slot soon comes in contact with the edges of the creased back end of the diamond and pushes it forward and downward upon the center of the diamond, so that by the time the blank is released from the rolls P P' the back fold is completed, being held in position between the guide-roller $Q^2$ and plate $Q^4$ and the plain surface of the disks composing the roller Q. At this point the blank is gripped between the plain surfaces of the disks Q and the roller $Q^3$ and is fed forward with accelerated speed, the slots Q' in the roller Q being so placed that they will be over the roller $Q^3$ at the same time that the line $z^4 z^4$ of the blank lies on said roller. In this way I avoid any pressure on the crease $z^4 z^4$, as at no other point save on roller $Q^3$ is there any clamping action between the segmental roller Q and the guide plates or rollers, between which and the roll the blanks pass. The rotating arm X is so placed that the segment $X^2$, which is a little longer than the portion of the diamond folded down at the back, shall press the blank against the roller R a little in front of the back fold and remain in rolling contact with said roller R while the said back fold is passing over it. In this way this fold of the diamond is pressed out upon the center and securely pasted to it. The forked arms $X'$ in front of the segment $X^2$ prevent the fold from flying up at the time when it is released by the roller Q and before the segment $X^2$ comes in contact with it. It also serves to push the front end of the diamond down in the direction of the apron $R^4$, so that it will strike the tapes $R^5$ at a proper angle. The front end or flap of the diamond will extend between the tapes $R^5$ for nearly its whole length, the tapes coming in contact only with its broadest portion. In this way the front end of the blank is drawn down between the tapes $R^5$ with the edge indicated by the letter $z^4$ foremost, and the roller $R'$ presses the front fold of the diamond down upon its center and upon the already folded back end and compresses it against the apron $R^4$, thus completing the bag, which, after passing under the roller $R'$, is usually delivered to a drying-cylinder, which holds its bottom together until the paste is sufficiently dry to prevent any danger of its coming apart at the seams.

The above-described apparatus for making the two final folds which complete the bottom of the bag possesses certain novel and valuable features, and is well adapted for use in connection with the mechanism for forming the diamond which I have above described. It is also well adapted for making the final folds on bag-blanks the diamond of which has been formed by other mechanism, and of course any good mechanism for making these final folds might be used in connection with my novel devices for forming the diamond. I therefore wish it to be clearly understood that while my mechanism for forming the diamond and my mechanism for forming the final folds are well adapted to be used together I do not in any way intend to limit those claims which relate to the one mechanism upon the use with them of the other mechanism.

The leading features of my invention will from the above description be easily distinguished. Generally speaking, they may be grouped as follows: first, the combination, with continuously-revolving feed-rolls and a device for partially opening the mouths of the blanks, of a distending device arranged to open the advancing tube in the plane of the bag-bottom; second, the combination, with the distending device, of the reciprocating tucker by which the folds lying above the bag-bottom are defined during and subsequent to the distention of the tube; third, the combination of a narrow support for the upper side of the distended blank with a narrow guide for the lower side, said support and guide being arranged as specified, so as to coact in spreading out the distended end of the blank into a diamond form; fourth, the combination, with the aforesaid spreading device, of folder-plates to hold the diamond in shape as it passes to the presser-rolls; lastly, the various combinations of the above elements of my invention with each other and the special and preferred arrangement and construction of my preferred mechanism are important features of my improvement, and will form the subject-matter for most of the claims; but I wish it to be clearly understood that, except where the special mechanical connections shown in the drawings are specifically referred to in the claims, I do not intend my invention to be understood as limited upon their use.

It will, I think, be clear from what has been said above, and indeed from their own characteristics, that the various leading features of my invention are not essentially interdependent, by which I mean, for instance, that my device, consisting of a narrow support to sustain one side of the open tube and a narrow feed-roll to draw down the opposite side and retract the first-mentioned side from said support, while for their efficient action they depend upon having the tube properly opened, does not require that it should be opened by the specific device for distending the tube, which forms another leading feature of my invention. Such distention might be brought about by very different mechanical devices, or even by the hand of the operator.

In the mechanism described for forming the two final folds which complete the manufacture of the bag the principal novelties lie in the use of the segmental rollers Q, having the peculiar form and motion with respect to the creasing-rolls described, and the revolving arm X, with its segments $X^2$, arranged to operate in connection with the rollers R R', the apron $R^4$, and the tapes $R^5$, as described.

In the following claims I have in referring to the unfolded sides of the blank distinguished them by the names "upper" and "lower;" but I do not wish to be understood as referring to their position with respect to the ground, for of course the machine would work as well were all of its operative parts reversed in relative position to the ground. By "upper" side it will therefore be understood that I mean the side directly acted on by the distending-fingers, and by "lower" side the side opposite to said so-called "upper" side.

Having now described my invention, what I claim as new, and desire to secure by Letters Patent, is—

1. In a bag-machine, the device for distending a bellows-folded blank in the plane of the bag-bottom to be formed on it, which consists of feed-rolls for feeding the blanks forward, in combination with a device for opening the advancing end of the blanks as they pass through the rolls, distending-fingers V V, or equivalent mechanism, as specified, for engaging the corners of the upper side of the blank, and gripping-fingers K³ K³, or equivalent mechanism, as specified, for engaging the corresponding corners of the lower side of the blank, said fingers and grippers or their equivalents being arranged and actuated to coact in distending the bellows-sided tube as it advances through the feed-rolls, substantially as shown and described.

2. In a bag-machine, the device for distending a bellows-sided blank in the plane of the bag-bottom and for defining the folds lying above said bottom, which consists of feed-rolls for feeding the blanks forward, in combination with a device for opening the advancing ends of the blanks, a device for distending the advancing blanks, consisting of the fingers V V and grippers K³ K³, or their equivalents, as specified, and a tucker having actuating mechanism whereby it is caused to strike and bend the upper side of the advancing blank on or about the line $z^2$ and to follow the motion of the blank while it is distending and until the fold at $z^2$ is fully defined, substantially as shown and described.

3. In a bag-machine, the combination, with feed-rolls for feeding the blanks forward, a distending device consisting of fingers V V and grippers K³ K³, or equivalent devices, as specified, for distending a bellows-folded tube as it advances through the feed-rolls, and a tucker for defining the folds lying above the distended part of the tube, of a narrow support placed so as to lie under the center of the upper side of the blank as it advances from the feed-rolls during the distention of its end, said support serving to draw out the upper end of the diamond as the upper side of the blank is withdrawn from it after distention, substantially as shown and described.

4. In a bag-machine, the combination, with feed-rolls for feeding the blanks forward, a distending device consisting of fingers V V and grippers K³ K³, or equivalent devices, as specified, for distending a bellows-folded tube as it advances through the feed-rolls, and a tucker for defining the folds lying above the distended part of the tube, of a narrow support placed so as to lie under the center of the upper side of the blank as it advances from the feed-rolls during the distention of its end, said support serving to draw out the upper end of the diamond as the upper side of the blank is withdrawn from it after distention, and a narrow guide situated between the feed-rolls aforesaid and the rolls which deliver the diamond-folded blank to the mechanism for completing the bag, said guide being arranged to lie within the lower side of the blank and serve to pull out the front point of the diamond, substantially as shown and described.

5. In a bag-machine, the combination, with feed-rolls for feeding the blanks forward, a distending device consisting of fingers V V, grippers K³ K³, or equivalent devices, as specified, for distending a bellows-folded tube as it advances through the feed-rolls, and a tucker for defining the folds lying above the distended part of the tube, of a narrow support placed so as to lie under the center of the upper side of the blank as it advances from the feed-rolls during the distention of its end, said support serving to draw out the upper end of the diamond as the upper side of the blank is withdrawn from it after distention, a narrow guide situated between the feed-rolls aforesaid and the rolls which deliver the diamond-folded blank to the mechanism for completing the bag, said guide being arranged to lie within the lower side of the blank and serve to pull out the front point of the diamond, and folder-plates arranged to close down on the diamond and hold it to form after it is drawn out, as aforesaid, and while the diamond-folded end of the blank is passing to the mechanism which completes the bag, substantially as shown and described.

6. In a bag-machine, the combination, with feed-rolls for feeding the bag-blanks forward and a device for opening the advancing end of the blank as it leaves the rolls, of distending-fingers having actuating mechanism whereby they are made to extend forward to receive the upper side of the partially-opened blank, to move apart so as to engage the corners of said upper side at a selected point, and to move together to permit the retraction of side above them, and grippers K³ K³, or equivalent mechanism, as described, to engage the edges of the lower side of the blank and coact with the distending-fingers to open the tube in the plane of the bag-bottom, substantially as shown and described.

7. In a bag-machine, the combination, with feed-rolls for feeding the bag-blanks forward and a device for opening the advancing end of the blank as it leaves the rolls, of distending-fingers having actuating mechanism whereby they are made to extend forward to receive the upper side of the partially-opened blank, to move apart so as to engage the corners of said upper side at a selected point, and to move together to permit the retraction of side above them, grippers K³ K³, or equivalent mechanism, as described, to engage the edges of the lower side of the blank and coact with the distending-fingers to open the tube in the plane of the bag-bottom, and a reciprocating tucker having operative mechanism whereby it is caused to strike and bend the advancing blank between the feed-rolls and the distending-fingers, and at the line where the fold $z^2$ is to be formed in the bag to remain in contact with the blank and move down with it until the fold $z^2$ is fully defined, and then move up to permit the advance of another blank, substantially as shown and described.

8. In a bag-machine, the combination, with feed-rolls for feeding the bag-blanks forward and a device for opening the advancing end of the blank as it leaves the rolls, of distending-fingers having actuating mechanism whereby they are made to extend forward to receive the upper side of the partially-opened blank, to move apart so as to engage the corners of said upper side at a selected point, and to move together to permit the retraction of side above them, grippers $K^3 K^3$, or equivalent mechanism, as described, to engage the edges of the lower side of the blank and coact with the distending-fingers to open the tube in the plane of the bag-bottom, a narrow support placed so as to lie centrally under the upper side of the blank as it advances from the feed-rolls and is distended, a narrow guide placed so as to lie centrally within the under side of the blank as it passes to the presser-rolls which complete the diamond, said support and guide coacting to spread out the distended end of the blank to a diamond form, and a reciprocating tucker having operative mechanism whereby it is caused to strike and bend the advancing blank between the feed-rolls and the distending-fingers and at the line where the fold $z^2$ is to be formed in the bag, to remain in contact with the blank and move down with it until the fold $z^2$ is fully defined, and then move up to permit the advance of another blank, substantially as shown and described.

9. In a bag-machine, the combination, with feed-rolls for feeding the bag-blanks forward and a device for opening the advancing end of the blank as it leaves the rolls, of distending-fingers having actuating mechanism whereby they are made to extend forward to receive the upper side of the partially-opened blank, to move apart so as to engage the corners of said upper side at a selected point, and to move together to permit the retraction of side above them, grippers $K^3 K^3$, or equivalent mechanism, as described, to engage the edges of the lower side of the blank and coact with the distending-fingers to open the tube in the plane of the bag-bottom, a narrow support placed so as to lie centrally under the upper side of the blank as it advances from the feed-rolls and is distended, a narrow guide placed so as to lie centrally within the under side of the blank as it passes to the presser-rolls which complete the diamond, said support and guide coacting to spread out the distended end of the blank to a diamond form, a reciprocating tucker having operative mechanism whereby it is caused to strike and bend the advancing blank between the feed-rolls and the distending-fingers and at the line where the fold $z^2$ is to be formed in the bag, to remain in contact with the blank and move down with it until the fold $z^2$ is fully defined, and then move up to permit the advance of another blank, and side folders actuated so as to close down and compress the diamond after it is formed, as aforesaid, and while the diamond-folded end is passing to the presser-rolls, which finally crease it to form and then open out to permit the distention and spreading out of another blank, substantially as shown and described.

10. In a bag-machine, the device for distending the blank in the plane of the bag-bottom, consisting of the feed-roll $K'$, having a coacting roll, in combination with a device for opening the mouth of the advancing bag-blank as it passes through said rolls, grippers $K^3 K^3$, pivoted on roll $K'$ and having actuating mechanism whereby they move inward to engage the corners of the lower side of the blank at selected points, remain in contact with the blank for a definite part of the rotation of the roll, and then move outward and release the blank, and reciprocating distending-fingers V V, having actuating mechanism whereby they are made to extend forward to permit the upper side of the blank to pass over them, to spread out so as to engage the corners of the said upper side at points corresponding to those on the side engaged by the grippers, and to close together again to permit the retraction of said upper side, said distending-fingers and grippers being arranged to coact in distending the blank, substantially as shown and described.

11. In a bag-machine, the device for opening the end of a bellows-folded tube into the diamond form, consisting of the feed-roll $K'$, having a coacting roll, in combination with a device for opening the mouth of the advancing bag-blank as it passes through said rolls, grippers $K^3 K^3$, pivoted on roll $K'$ and having actuating mechanism whereby they move inward to engage the corners of the lower side of the blank at selected points, remain in contact with the blank for a definite part of the rotation of the roll, and then move outward and release the blank, reciprocating distending-fingers V V, having actuating mechanism whereby they are made to extend forward to permit the upper side of the blank to pass over them, to spread out so as to engage the corners of the said upper side at points corresponding to those on the lower side engaged by the grippers, and to close together again to permit the retraction of said upper side, said distending-fingers and grippers being arranged to coact in distending the blank, a narrow guide placed so as to lie centrally within the lower side of the bag-blank as it is withdrawn from the distending-fingers, and a tucker S, having actuating mechanism whereby it is made to strike the blank as it passes from between the feed-rolls on the line where the fold $z^7$ is to be formed, to move down between the fingers V V and the roll $F'$ until the fold $z^7$ is fully defined and the upper side of the distended blank withdrawn from the said distending-fingers, and then retracted, all substantially as shown and described.

12. In a bag-machine, the combination, with feed-rolls for feeding bellows-folded blanks forward, of a curved former-plate $E^2$, whereby the advancing end of the blank is opened as it leaves the rolls, mechanism for distending the blanks on the plane of the bag-bottom to be formed and for defining the folds lying above said bottom, consisting of the fingers V V and grippers F³ F³, or their equivalents, as described, and a tucker S, all substantially as and for the purpose specified.

13. In a bag-machine, the combination, with the feed-rolls for feeding the blanks forward, a device for distending bellows-folded blanks, consisting of the fingers V V, and grippers F³ F³, or equivalent mechanism, as specified, and a tucker S, arranged to coact with said distending device, as described, of the narrow drawing-rollers L L' and a narrow guide placed to lie within the lower side of the blank and coact with the roll L' in drawing the distended end of the blank to the diamond form.

14. In a bag-machine, the combination, with the feed-rolls for feeding the blanks forward, a device for distending bellows-folded blanks, consisting of the fingers V V and grippers F³ F³, or equivalent mechanism, as specified, and a tucker S, arranged to coact with said distending device, as described, of the narrow drawing-rollers L L' and the drawing-rolls M M', said roll M' being narrow and arranged to rest centrally within the lower blank side, so as to coact with roller L in drawing out the distended end of the blank to the diamond form.

15. In a bag-machine, the combination, with the feed-rolls for feeding the blanks forward, a device for distending bellows-folded blanks, consisting of the fingers V V and grippers F³ F³, or equivalent mechanism, as specified, and a tucker S, arranged to coact with said distending device, as described, of a narrow support placed so as to lie centrally under the upper side of the blank as it advances and is distended and the drawing-rolls M M', said roll M' being narrow and placed so as to lie centrally within the under side of the blank, so as to coact with the narrow support aforesaid in drawing out the distended end of the blank into the diamond form.

16. In a bag-machine substantially as specified, the combination, of the supporting-roll L' with the reciprocating distending-fingers V V, so that the ends of said fingers in their forward position lie beneath the rim of said roll.

17. In a bag-machine substantially as specified, the combination of the loosely-journaled roll L', having a spring-supported sustaining-arm L⁴ and adjustable stop L³, with the draw-roll L, having a portion of its surface cut away, so as to loosen the grip of said rolls on the blank and permit its withdrawal from between said rolls.

18. In a bag-machine substantially as specified, the combination of the feed-rolls K K', the curved former E², the rolls L L', to engage the upper side of the blank, and the guide-plate E³, for directing said upper side between said rolls.

19. In a bag-machine substantially as specified, the combination, with a rocker-shaft V', of distending-fingers V V, journaled in said rocker-shaft, and actuating-cams whereby the shaft is oscillated and the fingers rotated back and forward in their bearings, so as to give their points a double reciprocating motion.

20. In a bag-machine substantially as specified, the combination of the feed-roll K', the fingers K³ K³, secured at the outer edges of said roll, and the cams K² K², whereby said fingers are made to move inward and engage the blank at a certain point to remain in their inward position for a determined period in the rotation of roll K', and then allowed to move out to release the blank.

21. In a bag-machine substantially as specified, the combination of the tucker S with a reciprocating lever connected with said tucker, cam mechanism for actuating said lever to regulate the up-and-down stroke of the tucker, guides T, within which said tucker reciprocates, a rock-shaft T', attached to said guides, and cam mechanism for actuating said rock-shaft, so as to guide the edge of the tucker during its downward and upward motion.

22. In a bag-machine substantially as specified, the combination, with the feed-roll K', of the tucker S, a reciprocating lever connected with said tucker, cam mechanism for actuating said lever to regulate the up-and-down stroke of the tucker, guides T, within which said tucker reciprocates, a rock-shaft T', attached to said guides, and cam mechanism for actuating said rock-shaft, so as to guide the edge of the tucker during its downward stroke in a path close to the face of roll K'.

23. In a bag-machine substantially as specified, the combination, with the roll M and plate M², or equivalent backing, of the folder-plates U U, having actuating cams whereby they are caused to compress and hold the diamond after it is brought to shape and while it passes from the forming mechanism to the presser-rolls, and the presser-rolls N N'.

24. In a bag-machine substantially as specified, the combination of the tucker S, mechanism for actuating said tucker, as specified, the roll M, and plate M², comprising a backing or support for the blank or equivalent backing, the folder-plates U U, having actuating-cams whereby they are caused to fold down against the tucker and backing to compress and hold the diamond to form, and the presser-rolls N N'.

25. In a bag-machine substantially as specified, the combination, with the drawing-rolls M M', the said roll M' being narrow to aid in drawing out the diamond, as specified, of the presser-rolls N N' and the folder-plates U U, arranged to fold down against roll M on each side of roll M' and having actuating-cams whereby said plates are folded down on the diamond and remain in contact with it while it passes to the rolls N N' aforesaid.

26. In a bag-machine substantially as specified, the combination, with the folder-plates U U, for holding the diamond in shape after it is formed and as it passes to the presser-rolls, of the presser-rolls N N', and the paste-roll W, held in contact with the roll N' and grooved to contain lines of paste, substantially as specified, whereby the diamond is, while being compressed, furnished with paste to complete the closing of the bag-bottom.

27. In mechanism for forming the final folds on a diamond-folded bag-blank, the combination of creasing-rolls for creasing the diamond on the lines of its final folds, the segmental double roll Q, rotating with greater speed than said creaser-rolls and having recesses $Q^a$ to engage the edges of the back flap, and guides to hold the blank in contact with said segmental roll.

28. In mechanism for forming the final folds on a diamond-folded bag-blank, the combination of creasing-rolls for creasing the diamond on the lines of its final folds, the segmental double roll Q, rotating with greater speed than said creaser-rolls, having recesses $Q^a$ to engage the edges of the back flap, guides to hold the blank in contact with said segmental roll, and a presser-roll $Q^3$, so placed that the blank will be gripped between it and roll Q after it is released by the creasing-rolls.

29. In mechanism for forming the final folds on a diamond-folded bag-blank, the combination of creasing-rolls for creasing the diamond on the lines of its final folds, the segmental double roll Q, rotating with greater speed than said creaser-rolls, having recesses $Q^a$ to engage the edges of the back flap, and recesses $Q'$, guides to hold the blank to the face of roll Q, and a presser-roll $Q^3$, to coact in feeding the blank forward when it is released by the creasing-rolls, all substantially as and for the purpose specified.

30. In mechanism for forming the final folds on a diamond-folded bag-blank, the combination, with the double segmental roller Q, of the roll R and the rotating arm X, having the segmental presser-plate $X^2$ for pressing the back flap down upon the bottom of the blank.

31. In mechanism for forming the final folds on a diamond-folded bag-blank, the combination, with the double segmental roller Q, of the roll R, the rotating arm X, having the segmental presser-plate $X^2$ for pressing the back flap down upon the bottom of the blank, the apron $R^4$, the roll $R'$, and the tapes $R^5$, coacting to press down the front flap and complete the bag.

32. In mechanism for forming the final folds on a diamond-folded bag-blank, the combination, with the double segmental roller Q, of the roll R, the rotating arm X, having the segmental presser-plate $X^2$ for pressing the back flap down upon the bottom of the blank, and the fork $X'$, the apron $R^4$, the roll $R'$, and the tapes $R^5$, coacting to press down the front flap and complete the bag.

CHAS. B. STILWELL.

Witnesses:
FRANK A. MULLIKIN,
JOSHUA MATLACK, Jr.